United States Patent
Hanada et al.

(10) Patent No.: US 12,189,253 B2
(45) Date of Patent: Jan. 7, 2025

(54) DISPLAY DEVICE

(71) Applicant: Japan Display Inc., Tokyo (JP)

(72) Inventors: Akihiro Hanada, Tokyo (JP); Takuo Kaitoh, Tokyo (JP); Ryo Onodera, Tokyo (JP); Motochika Yukawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/673,809

(22) Filed: May 24, 2024

(65) Prior Publication Data

US 2024/0402553 A1    Dec. 5, 2024

(30) Foreign Application Priority Data

Jun. 5, 2023 (JP) ................. 2023-092699

(51) Int. Cl.
| | | |
|---|---|---|
| *G02F 1/1339* | (2006.01) | |
| *G02F 1/1333* | (2006.01) | |
| *G02F 1/1343* | (2006.01) | |
| *G02F 1/1362* | (2006.01) | |
| *G02F 1/1368* | (2006.01) | |

(52) U.S. Cl.
CPC ...... *G02F 1/13629* (2021.01); *G02F 1/13394* (2013.01); *G02F 1/1368* (2013.01); *G02F 1/133357* (2021.01); *G02F 1/134309* (2013.01); *G02F 1/136227* (2013.01)

(58) Field of Classification Search
CPC ............ G02F 1/1333; G02F 1/133345; G02F 1/133357; G02F 1/1339; G02F 1/13394; G02F 1/1343; G02F 1/134309; G02F 1/13439; G02F 1/1345; G02F 1/13458; G02F 1/1362; G02F 1/136204; G02F 1/136209; G02F 1/136213; G02F 1/136227; G02F 1/136286; G02F 1/13629; G02F 1/1368

See application file for complete search history.

(56) References Cited

U.S. PATENT DOCUMENTS

| | | | |
|---|---|---|---|
| 2007/0291217 A1* | 12/2007 | Kang | ........... G02F 1/136227 349/156 |
| 2018/0217424 A1* | 8/2018 | Murakoso | ............. G02F 1/1339 |
| 2020/0127011 A1 | 4/2020 | Yamazaki et al. | |
| 2022/0004052 A1 | 1/2022 | Ohue | |
| 2023/0350257 A1 | 11/2023 | Muramoto et al. | |

FOREIGN PATENT DOCUMENTS

| | | |
|---|---|---|
| JP | 2020160254 A | 10/2020 |
| WO | 2018130920 A1 | 7/2018 |
| WO | 2022153665 A1 | 7/2022 |

* cited by examiner

*Primary Examiner* — Thoi V Duong
(74) *Attorney, Agent, or Firm* — Maier & Maier, PLLC

(57) ABSTRACT

A display device includes a first conductive layer arranged on a first substrate and extending in a first direction, a first insulating film arranged on the first conductive layer, a second conductive layer arranged on the first insulating film and extending in a second direction intersecting the first direction, a second insulating film arranged on the second conductive layer and extending in the first direction and the second direction, a transparent conductive layer arranged on the second insulating film and extending in the first direction and the second direction, a third insulating film arranged on the first conductive layer, and a second substrate opposing the first substrate.

11 Claims, 20 Drawing Sheets

FIG. 17A
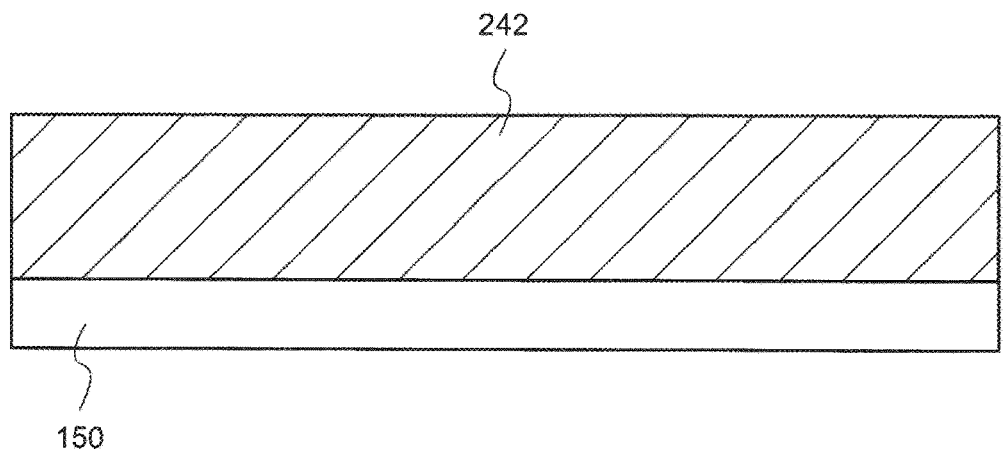
FIG. 17B
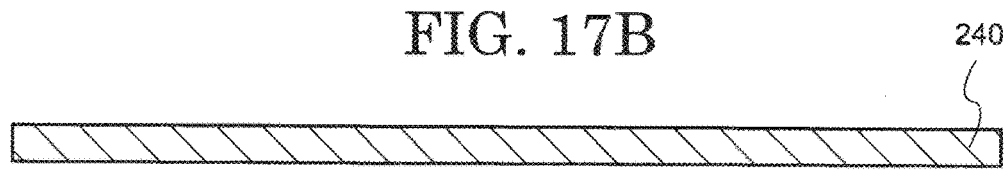
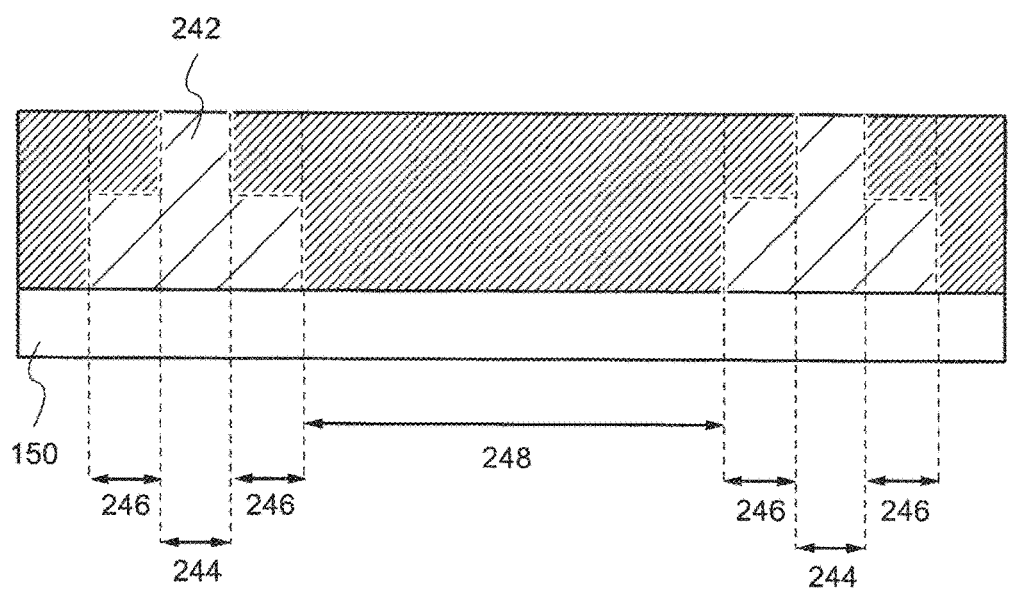

DISPLAY DEVICE

CROSS-REFERENCE TO RELATED APPLICATIONS

This application claims the benefit of priority to Japanese Patent Application No. 2023-092699, filed on Jun. 5, 2023, the entire contents of which are incorporated herein by reference.

FIELD

An embodiment of the present invention relates to a display device.

BACKGROUND

In recent years, a transparent display that allows the background of one side to be visually recognizable from the other side has been developed (see Japanese laid-open patent publication No. 2020-160254, International patent publication No. 2022/153665, International patent publication No. 2018/130920). In a transparent display, an image can be viewed from both front and back surfaces, so that an image or a character can be viewed from two opposite directions with the transparent display interposed therebetween.

Generally, a spacer is arranged in a liquid crystal display device for maintaining a cell gap between an array substrate and a counter substrate. The spacer is arranged at an intersection between a gate wiring and a source wiring so as not to reduce an aperture ratio of a pixel.

SUMMARY

A display device according to an embodiment of the present invention includes a first conductive layer arranged on a first substrate and extending in a first direction, a first insulating film arranged on the first conductive layer, a second conductive layer arranged on the first insulating film and extending in a second direction intersecting the first direction, a second insulating film arranged on the second conductive layer and extending in the first direction and the second direction, a transparent conductive layer arranged on the second insulating film and extending in the first direction and the second direction, a third insulating film arranged on the first conductive layer, and a second substrate opposing the first substrate, wherein the second insulating film has a first protrusion protruding above a surface of the first transparent conductive layer, a first opening surrounding the first protrusion is arranged in the first transparent conductive layer, a second opening surrounding the first protrusion is arranged in the third insulating film, and the first protrusion is arranged to maintain a gap between the first substrate and the second substrate.

BRIEF DESCRIPTION OF DRAWINGS

FIG. 17A is a diagram illustrating a method for manufacturing a display device according to an embodiment of the present invention.

FIG. 17B is a diagram illustrating a method for manufacturing a display device according to an embodiment of the present invention.

DESCRIPTION OF EMBODIMENTS

Figure 1:
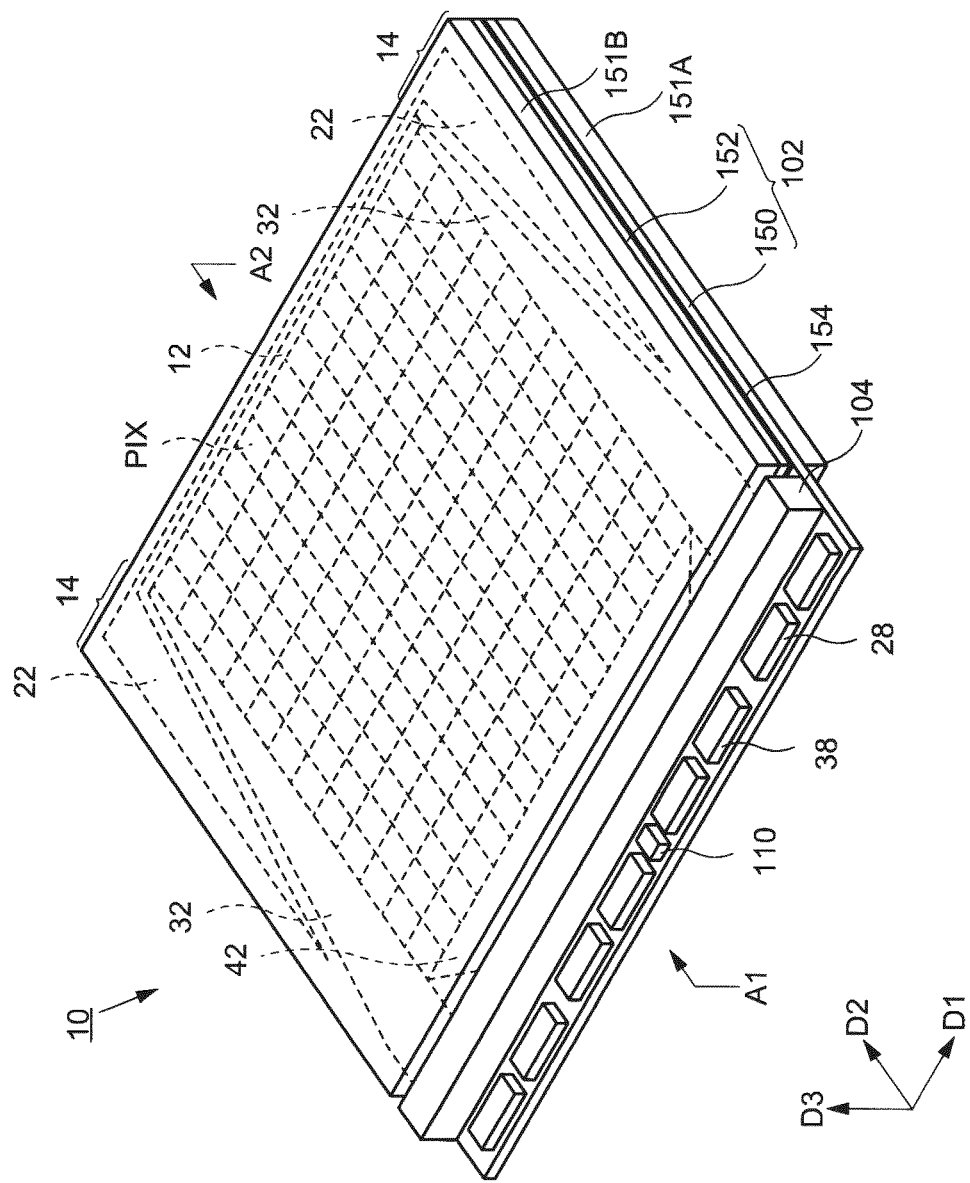
FIG. 1 is a perspective view illustrating an outline of a display device according to an embodiment of the present invention.

Hereinafter, embodiments of the present invention will be described with reference to the drawings and the like. However, the present invention can be implemented in various aspects without departing from the gist thereof, and is not to be construed as being limited to the description of the embodiments exemplified below. In addition, in order to make the description clearer with respect to the drawings, the width, thickness, shape, and the like of each part may be schematically represented in comparison with actual embodiments, but the schematic drawings are merely examples, and do not limit the interpretation of the present invention. Further, in the present specification and the drawings, the same or similar elements as those described with respect to the above-described drawings are denoted by the same reference signs, and redundant description may be omitted. In addition, in the specification and the like, ordinal numbers are given for convenience in order to distinguish parts, members, and the like, and do not indicate priority or order.

In an embodiment of the present invention, in the case where a plurality of films is formed by processing a single film, the plurality of films may have different functions and roles. However, the plurality of films is derived from a film formed as the same layer in the same process, and have the same layer structure and the same material. Therefore, the plurality of films is defined as being present in the same layer. In addition, in the case where the plurality of films is formed by processing a certain film, in the present specification and the like, the films may be described separately using -1, -2, and the like.

In the specification and the like, expressions such as "above" and "below" represent a relative positional relationship between a structure of interest and another structure. In the present specification and the like, in a side view, a direction from a first substrate to a pixel electrode, which will be described later, is defined as "above", and a reverse direction thereof is defined as "below". In the specification and claims, the expression "above" in describing the manner of arranging another structure on a certain structure shall include both arranging another structure directly above a certain structure and arranging another structure over a certain structure via yet another structure, unless otherwise specified.

In the specification and the like, a bottom-gate drive is one in which on/off is controlled by a gate electrode arranged below a semiconductor layer. In addition, in the specification and the like, a top-gate drive is one in which on/off is controlled by a gate electrode arranged above the semiconductor layer. Further, in the present specification, a dual-gate drive is one in which on/off is controlled by inputting the same control signal to the gate electrode arranged above and below the semiconductor layer.

First Embodiment

A display device 10 according to an embodiment of the present invention will be described with reference to FIG. 1 to FIG. 13.

[Outline of Display Device]

FIG. 1 shows a perspective view of the display device 10 according to an embodiment of the present invention. The display device 10 includes a display panel 102 including an array substrate 150 (also referred to as a first substrate), a counter substrate 152 (also referred to as a second substrate), a liquid crystal layer (not shown) between the array substrate 150 and the counter substrate 152, a gate driving circuit 28, and a source driving circuit 38, a light source 104, and a first transparent substrate 151A and a second transparent substrate 151B sandwiching the display panel 102. In the following explanation referring to FIG. 1, one direction on the plane of the display panel 102 is referred to as a direction D1, a direction orthogonal to the direction D1 is referred to as a direction D2, and a direction orthogonal to a D1-D2 plane is referred to as a direction D3.

The array substrate 150 and the counter substrate 152 have light transmittance. The array substrate 150 and the counter substrate 152 are preferably transparent to visible light. The counter substrate 152 is arranged in the direction D3 so as to face the array substrate 150. The array substrate 150 and the counter substrate 152 are bonded to each other with a seal member 154 while being arranged opposite to each other with a gap therebetween. A liquid crystal layer (not shown) is arranged in the gap between the array substrate 150 and the counter substrate 152.

The display panel 102 has a display region 12 and a peripheral region 14 outside the display region 12. A plurality of pixels PIX is arranged in a row direction and a column direction in the display region 12. In this case, the row direction refers to a direction parallel to the direction D1, and the column direction refers to a direction parallel to the direction D2. The display region 12 includes m pixels arranged in the row direction and n pixels are arranged in the column direction. The values of m and n are appropriately set in accordance with a display resolution in the vertical direction and a display resolution in the horizontal direction. A gate wiring (also referred to as a scanning signal line) is arranged in the direction D1 and a source wiring (also referred to as a data signal line) is arranged in the direction D2 in the display region 12.

The gate driving circuit 28 and the source driving circuit 38 are arranged in the peripheral region 14 of the array substrate 150. FIG. 1 shows an embodiment in which the gate driving circuit 28 and the source driving circuit 38 are arranged in an integrated circuit (IC) and implemented in a COG (Chip on Glass) method in the array substrate 150. The gate driving circuit 28 and the source driving circuit 38 are not limited to the illustrated embodiments, and may be implemented in a COF (Chip on Film) method or may be formed by a thin film transistor (TFT) of the array substrate 150.

A gate wiring region 32, a common wiring region 22, and a source wiring region 42 are arranged in the peripheral region 14. The gate wiring region 32 is a region where a pattern formed by a wiring connecting the gate driving circuit 28 and a gate wiring GL arranged in the display region 12 is arranged. The common wiring region 22 is a region where a pattern formed by a common wiring is arranged. The common wiring region 22 is used as a wiring for applying a common voltage to a common electrode 218 (see FIG. 7) arranged in the counter substrate 152. The source wiring region 42 is a region where a pattern formed by a wiring connecting the source driving circuit 38 and a data signal line SL arranged in the display region 12 is arranged.

The light source 104 has a structure along the direction D1. For example, the light source 104 is configured by a light-emitting diode (LED) arranged along the direction D1. A detailed structure of the light source 104 is not limited and may include an optical member such as a reflector, a diffuser, a lens, and the like, in addition to a light-emitting diode arranged in the direction D1. The light source 104 and a light emission control circuit 110 for controlling the light source 104 may be arranged as a separate member independent of the display panel 102. In addition, the light source 104 may be one in which light emission timing is controlled by the light emission control circuit 110 synchronized with the gate driving circuit 28 and the source driving circuit 38. Similar to the light source 104, the light emission control circuit 110 for controlling the light source 104 may be arranged as a separate member from the display panel 102, may be mounted on the array substrate 150 as a separate component, or may be incorporated in the gate driving circuit 28 or the source driving circuit 38.

The first transparent substrate 151A and the second transparent substrate 151B are arranged so as to sandwich the display region 12 and the peripheral region 14. The first transparent substrate 151A and the second transparent substrate 151B have a function as a protective member of the display panel 102. In addition, as described with respect to FIG. 2, the first transparent substrate 151A and the second transparent substrate 151B function as a light guide plate for introducing light emitted from the light source 104 into the display panel 102.

Figure 2:
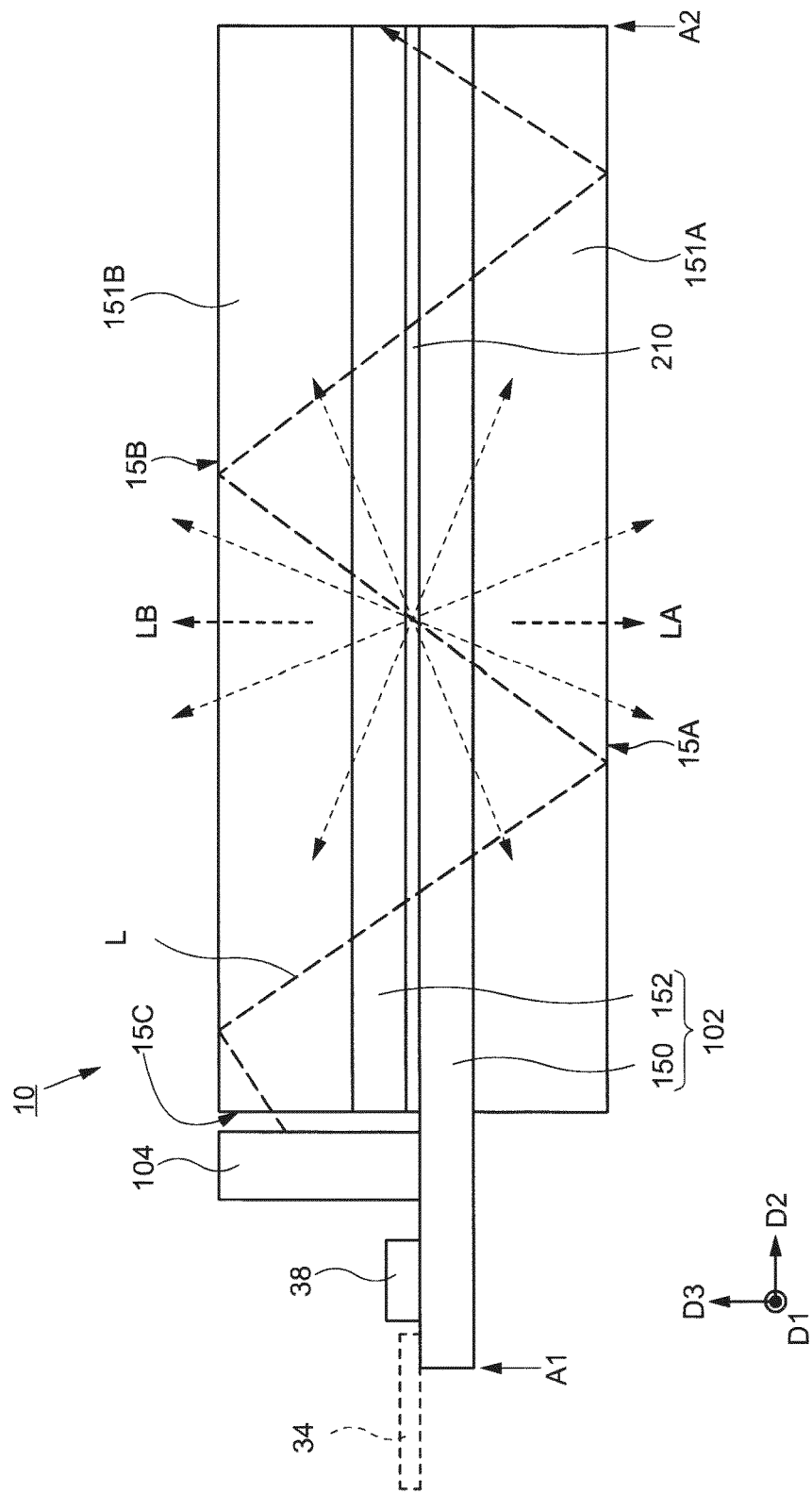
FIG. 2 is a schematic cross-sectional view showing a structure corresponding to A1-A2 of a display device shown in FIG. 1.

FIG. 2 shows a cross-sectional structure of the display device 10 corresponding to A1-A2 shown in FIG. 1. As shown in FIG. 2, the first transparent substrate 151A is arranged on the array substrate 150 side of the display panel 102, and the second transparent substrate 151B is arranged on the counter substrate 152 side. The first transparent substrate 151A and the second transparent substrate 151B may be a glass substrate or a plastic substrate. The first transparent substrate 151A and the second transparent substrate 151B preferably have refractive indices equivalent to those of the array substrate 150 and the counter substrate 152. The array substrate 150, the first transparent substrate 151A, and the counter substrate 152 and the second transparent substrate 151B are bonded to each other with a transparent adhesive (not shown).

The display panel 102 is arranged such that the array substrate 150 and the counter substrate 152 face each other, and a liquid crystal layer 210 is arranged therebetween. The array substrate 150 is larger than the counter substrate 152 and has a size such that part of the peripheral region 14 is exposed from the counter substrate 152. A driving circuit (the source driving circuit 38 in FIG. 2) is arranged in the array substrate 150. In addition, a flexible printed circuit 34 is attached to the periphery of the array substrate 150.

The light source 104 is arranged adjacent to one side of the first transparent substrate 151A or the second transparent substrate 151B. FIG. 2 shows a configuration in which the light source 104 is arranged along one side of the second transparent substrate 151B. In addition, although FIG. 2 shows a configuration in which the light source 104 is attached to the array substrate 150, the configuration is not limited to the configuration in which the light source 104 is arranged, and an attachment configuration is not limited as long as an attachment position can be fixed. For example, the light source 104 may be supported by a housing surrounding the display panel 102.

As shown in FIG. 2, the light source 104 is arranged along a first side 15C of the second transparent substrate 151B. As shown in FIG. 2, the light source 104 irradiates the first side surface 15C of the second transparent substrate 151B with light L. The light source 104 may also be referred to as a side light source because it emits the light L toward the first side 15C. The first side surface 15C of the second transparent substrate 151B facing the light source 104 serves as a light incident surface.

As schematically shown in FIG. 2, the light L incident from the first side 15C of the second transparent substrate 151B propagates in a direction away from the first side 15C (the direction D2) while being reflected by a second plane 15B of the second transparent substrate 151B and a first plane 15A of the first transparent substrate 151A. When the light L is directed to the outside from the first plane 15A of the first transparent substrate 151A and the second plane 15B of the second transparent substrate 151B, the light L proceeds from a medium having a large refractive index to a medium having a small refractive index. In this case, if an incident angle of the light L incident on the first plane 15A and the second plane 15B is larger than the critical angle, the light L is totally reflected, and is guided to the direction D2 while being reflected by the first plane 15A and the second plane 15B.

The liquid crystal layer 210 is formed of a polymer-dispersed liquid crystal. In the liquid crystal layer 210 formed of the polymer-dispersed liquid crystal, a scattering state and a non-scattering state are controlled for each pixel PIX (see FIG. 1). As shown in FIG. 2, at least part of the light L propagating while being reflected by the first plane 15A and the second plane 15B is scattered, when there is a pixel in which the liquid crystal layer 210 is in a scattered state, an incident angle of the scattered light becomes an angle smaller than the critical angle, scattered lights LA and LB are emitted to the outside from the first plane 15A and the second plane 15B, respectively, and the emitted scattered lights LA and LB are observed by an observer. In the display panel 102, in a region except for the region where the scattered lights LA and LB are emitted, the array substrate 150, the counter substrate 152, the first transparent substrate 151A, and the second transparent substrate 151B have light transmittance (transparent to visible light) and are substantially transparent because the liquid crystal layer 210 is in a non-scattering state, thereby allowing the observer to view a backside through the display panel 102.

Figure 3:
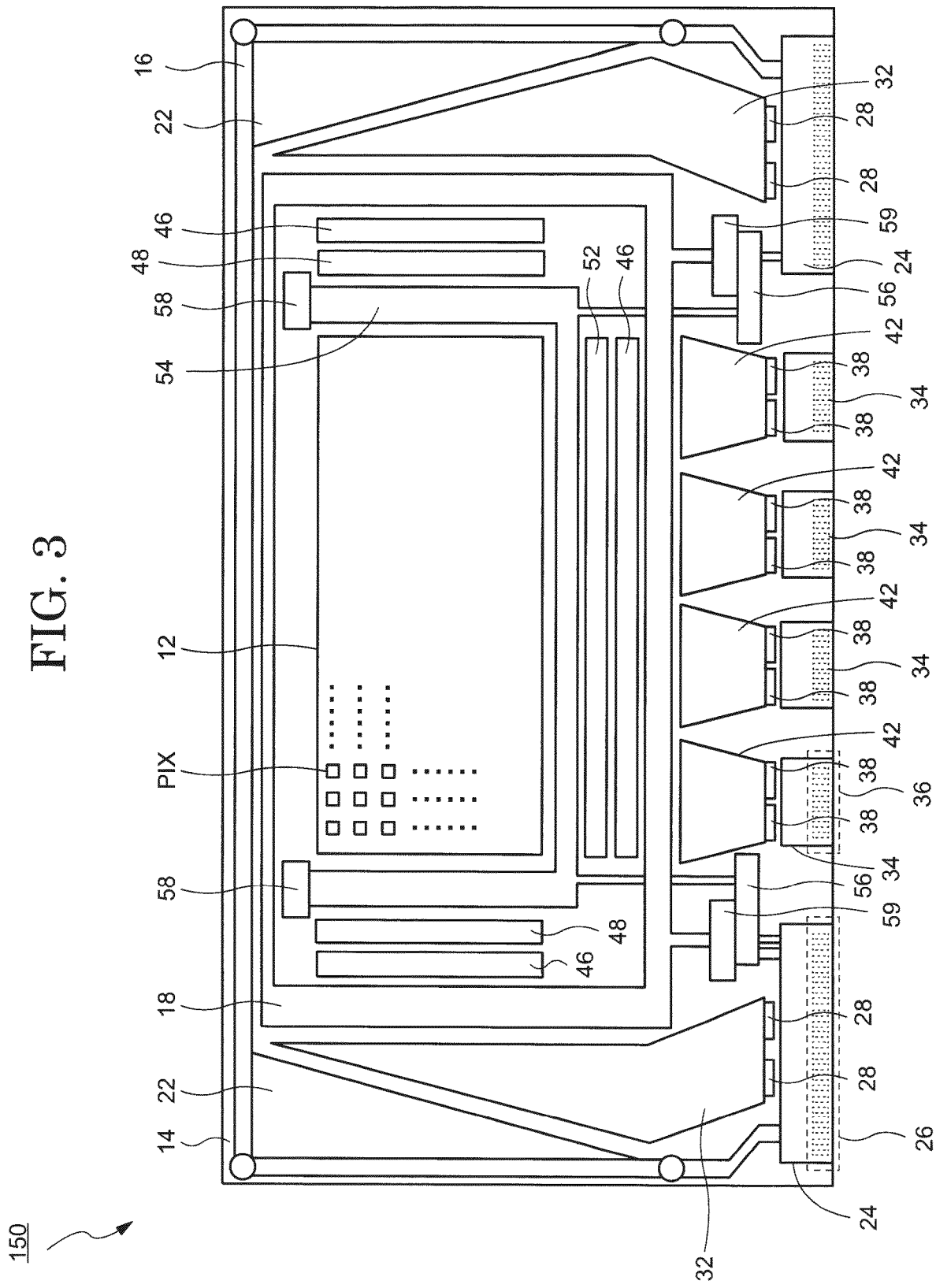
FIG. 3 is a plan view illustrating a configuration of a display device according to an embodiment of the present invention.

FIG. 3 is a plan view illustrating a configuration of the array substrate 150 of the display device 10 according to an embodiment of the present invention. As shown in FIG. 3, the array substrate 150 includes the display region 12 and the peripheral region 14.

The display region 12 includes the plurality of pixels PIX arranged in a matrix. Each of the plurality of pixels PIX includes a plurality of transistors and liquid crystal elements.

The peripheral region 14 is arranged to surround the display region 12. The peripheral region 14 refers to a region from the display region 12 to an edge of the array substrate 150 in the array substrate 150. In other words, the peripheral region 14 shall refer to a region except for the region where the display region 12 is arranged on the array substrate 150 (that is, a region outside the display region 12).

In addition to the gate driving circuit 28 and the source driving circuit 38, the gate wiring region 32, the source wiring region 42, common wirings 16 and 18, terminal portions 26 and 36, flexible printed circuits 24 and 34, and various inspection circuits are arranged in the peripheral region 14. The terminal portions 26 and 36 are arranged along one side of the array substrate 150.

The flexible printed circuit 24 is connected to the terminal portion 26. The flexible printed circuit 24 outputs various signals to the gate driving circuit 28, the common wirings 16 and 18, an ESD protective circuit 59, and a QD pad 56. The gate driving circuit 28 is connected to a plurality of gate wirings GL, and each of the plurality of gate wirings GL is electrically connected to each of the plurality of pixels PIX in the display region 12. In FIG. 3, a region where the plurality of gate wirings GL is arranged is shown as the gate wiring region 32, and a detailed arrangement of the plurality of gate wirings GL is omitted. The number of gate wirings GL connected to the two gate driving circuits 28 corresponds to the number of rows of pixels PIX in the display region 12. In FIG. 3, although a configuration in which the gate wiring region 32 is arranged apart from the display region 12 is shown, actually the gate wiring GL and the pixel PIX are electrically connected to each other.

The flexible printed circuit 34 is connected to the terminal portion 36. The flexible printed circuit 34 outputs a video signal to the source driving circuit 38. The source driving circuit 38 is connected to a plurality of source wirings SL, and each of the plurality of source wirings SL is electrically connected to each of the plurality of pixels PIX in the display region 12. In FIG. 3, a region where the plurality of source wirings SL is arranged is shown as the source wiring region 42, and a detailed arrangement of the plurality of source wirings SL is omitted. The number of source wirings SL connected to the eight source driving circuits 38 corresponds to at least three times the number of columns of pixels PIX in the display region 12. This embodiment will explain an example where the number of source wirings SL is four times the number of rows of pixels PIX arranged in the display region 12. In FIG. 3, although a configuration in which the source wiring region 42 is arranged apart from the display region 12 is shown, actually the source wiring SL and the pixel PIX are electrically connected to each other.

The common wiring 18, an ESD protective circuit 46, a gate inspection circuit 48, and an inspection line 54 are arranged between the gate wiring region 32 and the display region 12. The common wiring 18, the ESD protective circuit 46, a source inspection circuit 52, and the inspection line 54 are arranged between the source wiring region 42 and the display region 12. The inspection line 54 is connected to an ESD protective circuit 58 and the QD pad 56. In addition, the common wiring 18 is connected to the ESD protective circuit 59.

The common wiring 16 is arranged so as to surround the peripheral region 14 in the array substrate 150, and a signal is supplied from the two flexible printed circuits 24. In addition, the common wiring 16 is electrically connected to the mesh-shaped common wiring region 22.

The display device 10 is not limited to a high-speed driving panel such as a transparent display shown in FIG. 1 and FIG. 2. The display device 10 can be applied to a large panel used in a display device that is not the transparent display.

[Pixel Circuit]

Figure 4:
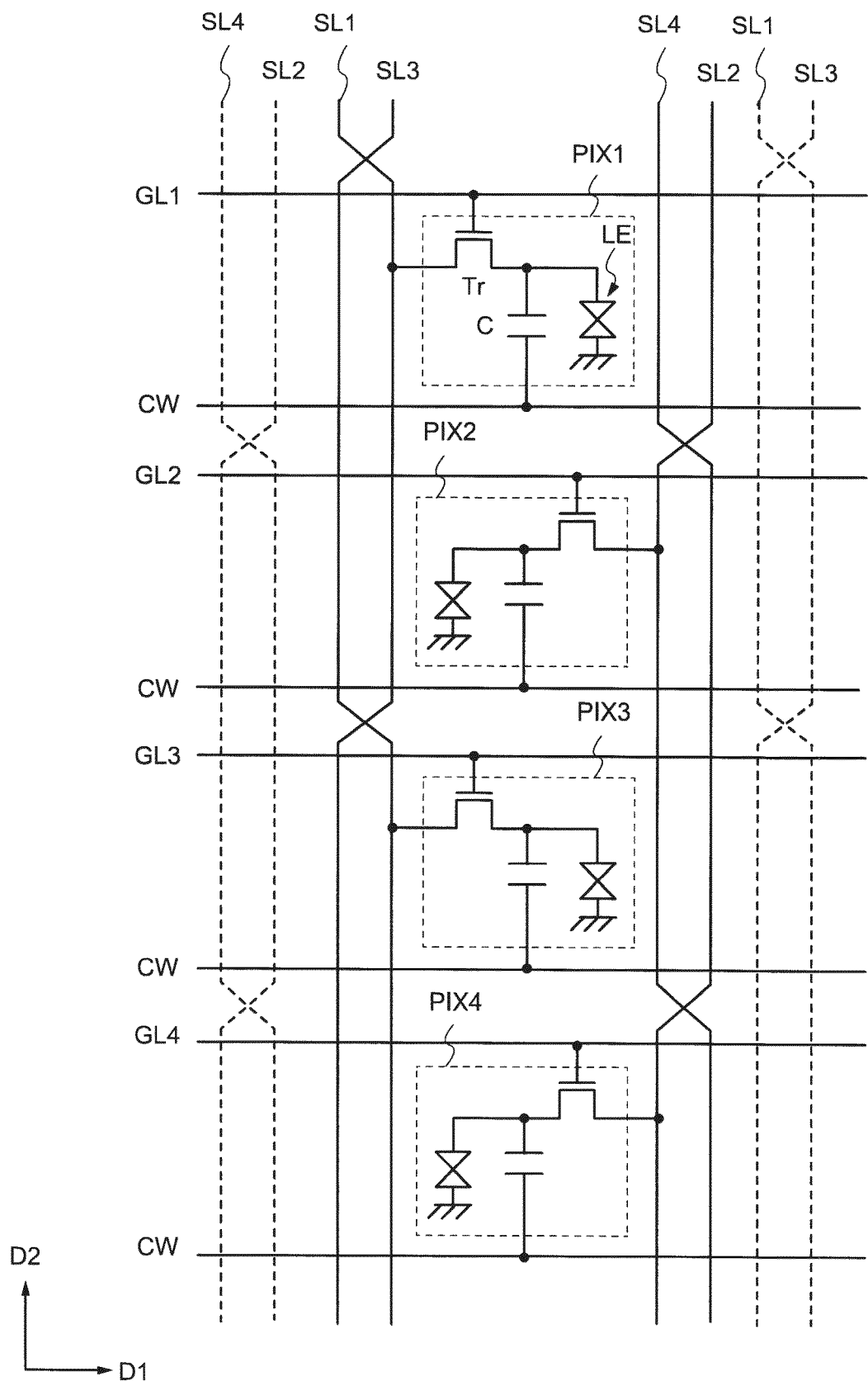
FIG. 4 is a circuit diagram showing pixels in a display device according to an embodiment of the present invention.

FIG. 4 is a diagram illustrating a pixel circuit of the pixel PIX included in the display device 10 according to an embodiment of the present invention. In the present embodiment, the display device 10 in which an on-voltage is simultaneously supplied to four gate wirings GL and four pixels PIX arranged in the column direction can be simultaneously charged by four source wirings SL will be described. As a result, one horizontal period can be made longer than a horizontal period in line order. In other words, it is possible to reduce the time required for scanning all the pixel lines arranged in the display region 12 to ¼. Therefore, the charging period for the pixel PIX can be sufficiently secured in a high-speed driving panel such as the transparent display or a large-sized panel. Hereinafter, a configuration of the pixel PIX according to the present embodiment will be described in detail.

In FIG. 4, four pixels PIX1 to PIX4 are arranged in the column direction (direction D2). Each of the four pixels PIX1 to PIX4 is electrically connected to each of the four gate wirings GL1 to GL4. In addition, each of the four pixels PIX1 to PIX4 is electrically connected to each of four source wirings SL1 to SL4. Each of the four pixels PIX1 to PIX4 is connected to a capacitance wiring CW. In the following explanation, in the case where the pixels PIX1 to PIX4 are not distinguished from each other, they are referred to as the pixel PIX. In the case where the gate wirings GL1 to GL4 and the source wirings SL1 to SL4 are not distinguished from each other, they are referred to as the gate wiring GL and the source wiring SL.

Figure 7:
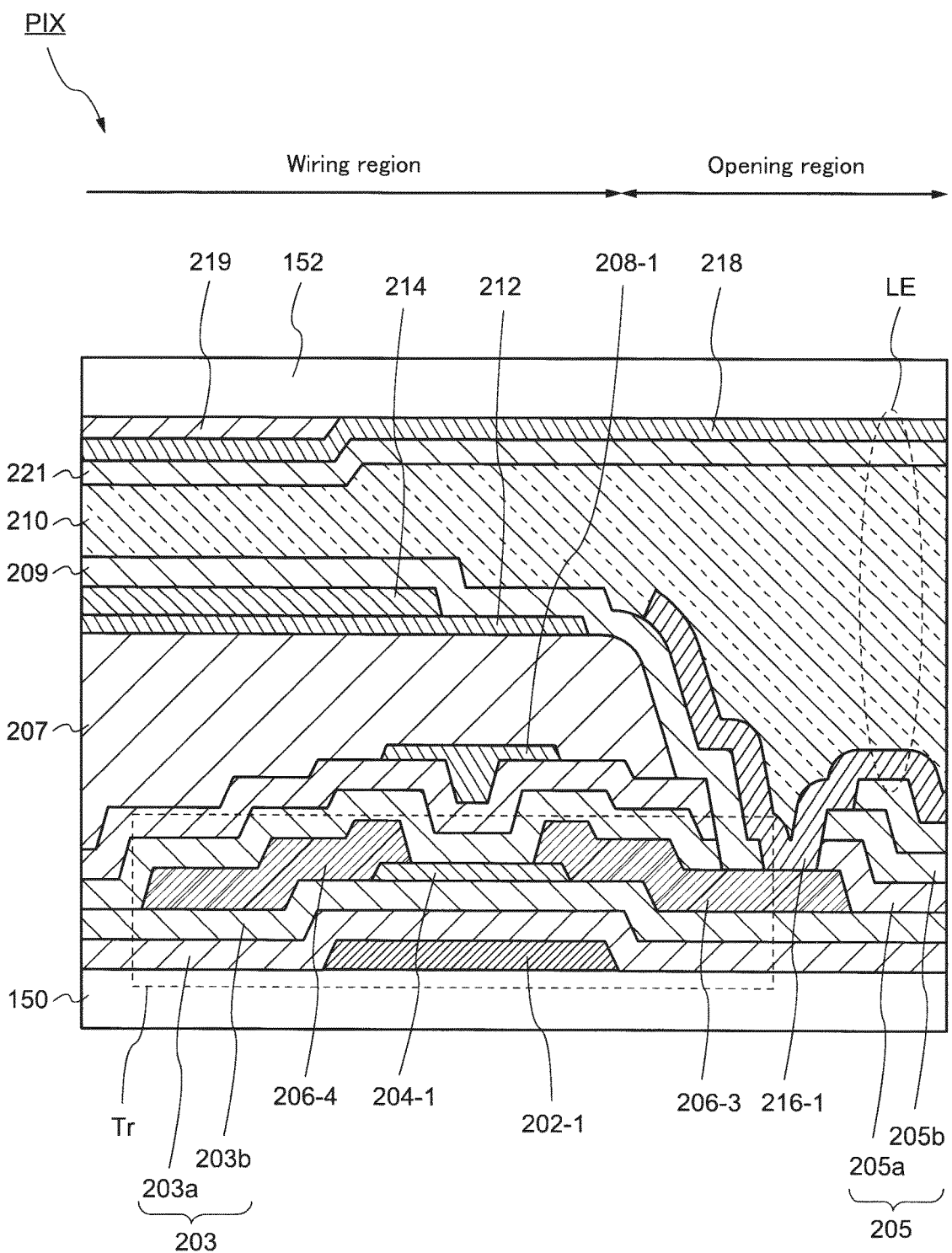
FIG. 7 is a cross-sectional view of a pixel in a display device according to an embodiment of the present invention.

The pixel PIX includes a transistor Tr, a liquid crystal element LE, and a storage capacitor C. A gate of the transistor Tr is connected to the gate wiring GL, a source of the transistor Tr is connected to the source wiring SL, and a drain of the transistor Tr is connected to one electrode of the liquid crystal element LE and one electrode of the storage capacitor C. The other electrode of the liquid crystal element LE is connected to the common electrode 218 (FIG. 7). The other electrode of the storage capacitor C is connected to the capacitance wiring CW.

The transistor Tr has a function of controlling the writing time of the video signal supplied from the source wiring SL to the pixel PIX by switching between the on-state and the off-state. When the transistor Tr is turned on, a potential corresponding to the video signal supplied from the source wiring SL can be written to the storage capacitor C electrically connected to the transistor Tr. In addition, when the transistor Tr is turned off, the potential held in the storage capacitor C can be held.

Figure 5:
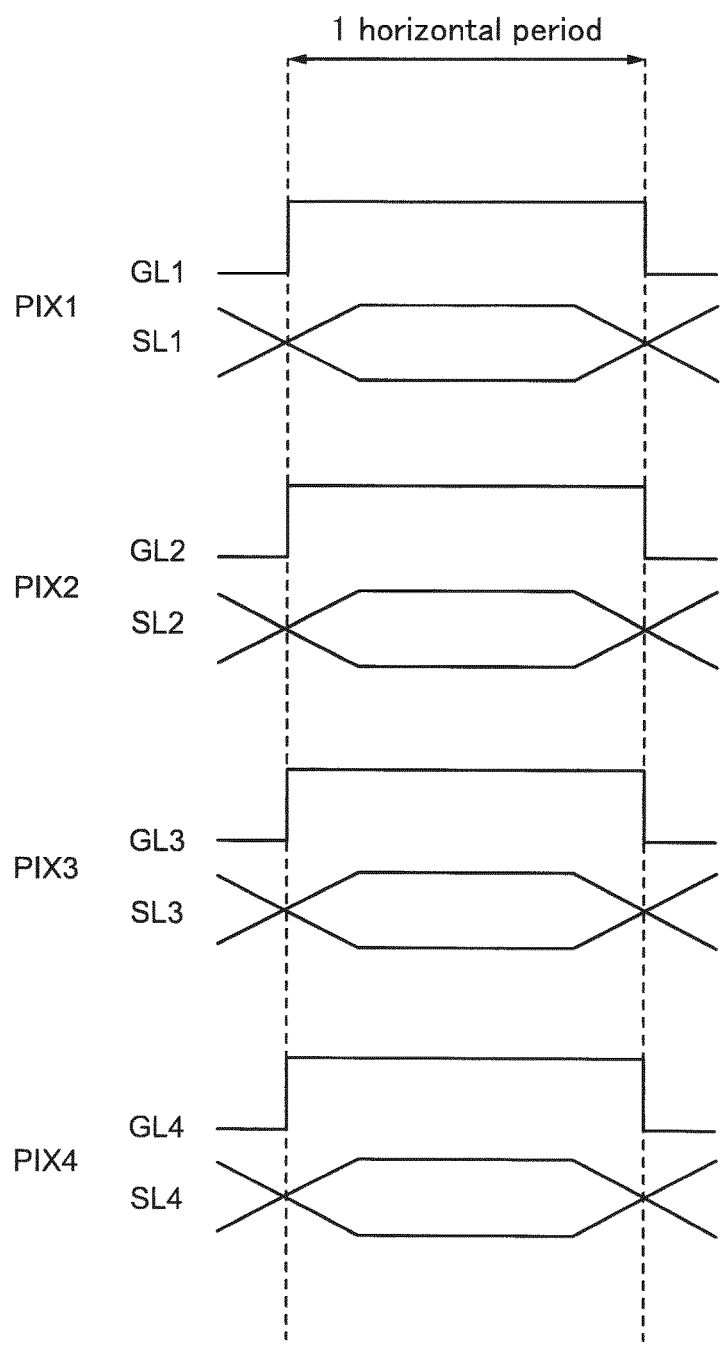
FIG. 5 is a timing chart of pixels in a display device according to an embodiment of the present invention.

FIG. 5 is a timing chart of the display device 10 according to an embodiment of the present invention. Normally, the gate wiring GL sequentially charges the pixel columns arranged in the direction D2 by using the same source wiring SL by supplying the on-voltage row by row. On the other hand, in the present embodiment, the on-voltage is simultaneously supplied to the four gate wirings GL, so that the transistor Tr of each of the four pixels PIX are simultaneously turned on. In this state, the video signal is simultaneously supplied to the different source wirings SL1 to SL4. As a result, the four pixels arranged in the direction D2 can be driven simultaneously.

[Planar Layout of Pixel]

Figure 6:
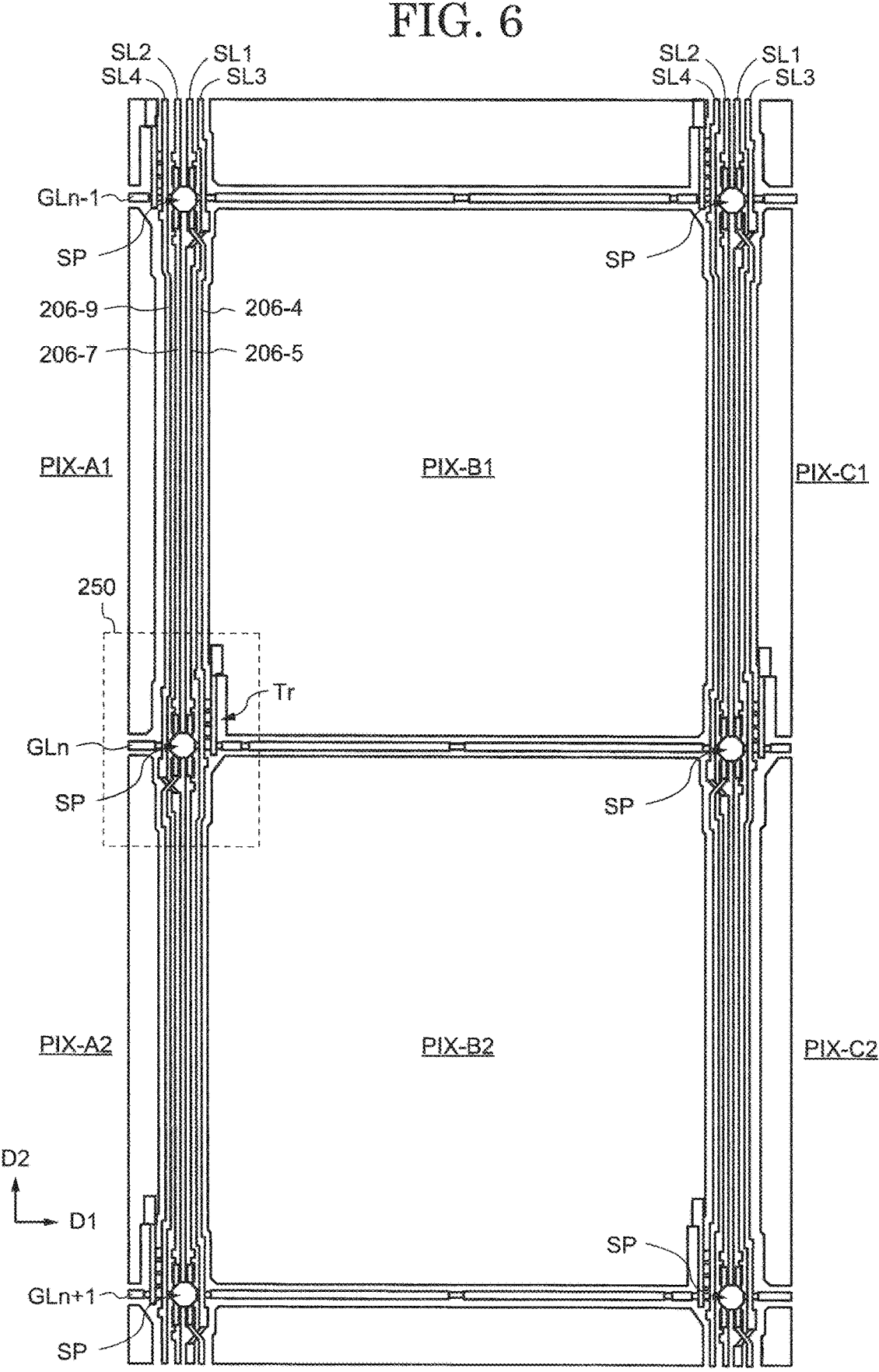
FIG. 6 is a planar layout of pixels in a display device according to an embodiment of the present invention.

A planar layout of pixels PIX in the display device 10 according to an embodiment of the present invention will be described with reference to FIG. 6. FIG. 6 shows a configuration in which PIX-A1, PIX-A2, PIX-B1, and PIX-B2 are in a plan view.

As shown in FIG. 6, gate wirings GLn−1 to GLn+1 are arranged along the direction D1. In addition, the source wirings SL1 to SL4 are arranged along the direction D2. In this case, an opening region of the pixel PIX-B1 is a region surrounded by the adjacent gate wiring GLn−1, a gate wiring GLn, the source wiring SL1, and the source wiring SL4.

As shown in FIG. 6, the source wiring SL1 and the source wiring SL3, and the source wiring SL2 and the source wiring SL4 are arranged so as to sandwich one column of the pixels PIX-B1 and PIX-B2. In other words, the four source wirings SL1 to SL4 are arranged between one column of the pixels PIX-A1 and PIX-A2 and one column of the pixels PIX-B1 and PIX-B2.

The transistor Tr is arranged in a region 250 where the gate wiring GL and the source wirings SL1 to SL4 intersect. In addition, the transistor Tr is connected to a pixel electrode. The pixel electrode is arranged in the opening region of the pixel PIX-B1. As shown in FIG. 6, a plurality of spacers SP is arranged at intersections of the pixel PIX arranged in a matrix. Alternatively, the plurality of spacers SP is arranged so as to have regularity with respect to the intersections of the pixel PIX arranged in a matrix.

For example, the plurality of spacers may be arranged in every other row and column of the pixel PIX. In other words, the spacer SP may not be arranged at the intersection adjacent to the intersection where the spacer SP is arranged.

The source wiring SL2 and the source wiring SL4 are adjacent to the pixel PIX-A1 and the pixel PIX-A2, and the source wiring SL1 and the source wiring SL3 are adjacent to the pixel PIX-B1 and the pixel PIX-B2, in the region 250 shown in FIG. 6 where the gate wiring GL gate and the source wirings SL1 to SL4 intersect with each other. To describe the position where the spacer SP is arranged, a spacer SP overlaps the source wiring SL3 adjacent to the pixel PIX-B1 and the pixel PIX-B2, and the source wiring SL2 adjacent to the pixel PIX-A1 and the pixel PIX-A2. A spacer SP overlaps the source wiring SL4 adjacent to a pixel PIX-B2 and a pixel PIX-B3 (not shown), and the source wiring SL3 adjacent to a pixel PIX-C2 and a pixel PIX-C3 (not shown).

The spacer SP intersects the gate wiring GL and is arranged above two source wirings sandwiched between two source wirings adjacent to the pixel among the source wirings SL1 to SL4 arranged adjacent to each other.

FIG. 7 is a cross-sectional view in the display device 10. In FIG. 7, the stacking order of the layers when the display device 10 is viewed in a cross-section will be described.

As shown in FIG. 7, a conductive layer 202-1 is arranged above the array substrate 150. A gate insulating film 203 is arranged above the conductive layer 202-1. An oxide semiconductor layer 204-1 is arranged above the gate insulating film 203. The oxide semiconductor layer 204-1 is arranged to face the conductive layer 202-1 via the gate insulating film 203. Conductive layers 206-3 and 206-4 are arranged above the oxide semiconductor layer 204-1. An insulating film 205 is arranged above the conductive layers 206-3 and 206-4. A conductive layer 208-1 is arranged above the insulating film 205.

In the present embodiment, the conductive layer 202-1 functions as the gate wiring GL (gate electrode). The conductive layer 206-3 functions as a drain electrode, and the conductive layer 206-4 functions as the source wiring SL (source electrode). The conductive layer 208-1 functions as a back gate. The conductive layer 202-1, the oxide semiconductor layer 204-1, the insulating film 205, and the conductive layers 206-3 and 206-4 function as the transistor Tr. In the present embodiment, although the transistor Tr is described as a bottom-gate-driven transistor, the present invention is not limited to this, and may be a top-gate-driven transistor or a dual-gate-driven transistor.

In the present embodiment, the gate insulating film 203 includes a stacked nitride insulating film 203a and an oxide insulating film 203b. The insulating film 205 includes a stacked oxide insulating film 205a and a nitride insulating film 205b. In addition, the oxide semiconductor layer 204-1 is sandwiched between the oxide insulating film 203b and the oxide insulating film 205a. Oxygen is released from the oxide insulating film 203b and the oxide insulating film 205a while processing the oxide insulating film 205a and the oxide insulating film 203b. The released oxygen may be supplied to the oxide semiconductor layer 204-1. This is preferable because oxygen defects in the oxide semiconductor layer 204-1 can be repaired.

A planarization film 207 is arranged above the conductive layer 208-1 and the insulating film 205. The planarization film 207 is arranged to alleviate the unevenness of various wiring constituting the transistor Tr. In the case where the display device 10 is applied to the transparent display, the planarization film 207 is preferably removed in the opening region of the pixel PIX. As a result, it is possible to suppress the planarization film 207 from absorbing light in the opening region. Therefore, the planarization film 207 is arranged at a position overlapping the gate wirings GLn−1 to GLn+1 and the source wirings SL1 to SL4 in FIG. 6. The planarization film 207 is arranged in a region overlapping the conductive layer 206-4 and the transistor Tr in FIG. 7. In addition, since the planarization film 207 is removed in the opening region of the pixel PIX, the planarization film 207 is not arranged between the conductive layer 206-3 and a pixel electrode 216-1.

A transparent conductive layer 212 is arranged above the planarization film 207. A conductive layer 214 is arranged in contact with the transparent conductive layer 212. The transparent conductive layer 212 and the conductive layer 214 function as the capacitance wiring CW. The transparent conductive layer 212 and the conductive layer 214 are arranged at positions overlapping the gate wirings GLn−1 to GLn+1 and the source wirings SL1 to SL4 shown in FIG. 6. In addition, the conductive layer 214 also functions as a light-shielding layer. In the present embodiment, although a configuration in which the conductive layer 214 is arranged above the transparent conductive layer 212 is described, a configuration in which the transparent conductive layer 212 is arranged above the conductive layer 214 is also possible. An insulating film 209 is arranged above the conductive layer 214. Since the planarization film 207 is removed in the opening region, the insulating film 209 is in contact with the insulating film 205 in the opening region. The pixel electrode 216-1 is arranged above the insulating film 209. The pixel electrode 216-1 is connected to the conductive layer 206-3 via a contact hole arranged in the insulating films 205 and 209. The pixel electrode 216-1 is arranged in the opening region of the pixel PIX. The pixel electrode 216-1 does not cover the source wiring SL and the transistor Tr, but covers part of the conductive layer 206-3.

As shown in FIG. 7, an end portion of the transparent conductive layer 212 is arranged between an end portion of the conductive layer 214 and the pixel electrode 216-1 above the planarization film 207 overlapping the transistor Tr. With this arrangement, the transistor Tr can be shielded from light and the transmittance of light in the opening region can be improved.

The counter substrate 152 is arranged to face the array substrate 150. A light-shielding layer 219, the common electrode 218, and an insulating film 221 are arranged in the counter substrate 152. The light-shielding layer 219 functions as a black matrix. In the structure shown in FIG. 7, the light-shielding layer 219 is arranged in a region overlapping the conductive layer 206-4 in FIG. 8. The light-shielding layer 219 is arranged in a grid pattern so as to cover the gate wirings GLn−1 to GLn+1 and the source wirings SL1 to SL4. The common electrode 218 has a size that extends over the entire surface of the display region 12. The light-shielding layer 219 may be formed of a metal film, and functions as an auxiliary electrode by being arranged in contact with the common electrode 218 formed of a transparent conductive film. The liquid crystal layer 210 is arranged between the array substrate 150 and the counter substrate 152 and is sealed with the seal member 154 (see FIG. 1). The liquid crystal element LE is configured by the pixel electrode 216-1, the liquid crystal layer 210, and the common electrode 218.

As described above, unevenness may occur on the outermost surface of the array substrate 150 by stacking the conductive layers having various thicknesses on the array substrate 150 in the display device. Since the plurality of spacers arranged in the counter substrate 152 contacts the unevenness on the outermost surface of the array substrate 150, variations in a cell gap occur. As a result, the display quality of the display device decreases.

In addition, the planarization film 207 is thickly formed in the display region in order to suppress parasitic capacitance from being formed by the gate wiring GL, the source wiring SL, and the conductive layer 214. The planarization film 207 is arranged in a lattice pattern so as to cover the gate wiring GL and the source wiring SL. That is, the planarization film 207 is removed in the opening region of the pixel. If the thickness of the planarization film 207 is greater than 2 μm and when a resist is applied as a mask for processing the conductive film or the insulating film formed on the planarization film 207, the applied resist may flow from above the planarization film 207 to the opening region. As a result, the thickness of the resist arranged on an upper portion of the planarization film 207 is reduced, thereby causing coating unevenness of the resist. When the conductive film or the insulating film is processed using such a resist mask, a process defect occurs in the conductive film or the insulating film.

In order to suppress the coating unevenness of the resist formed on the upper portion of the planarization film 207, it is possible to suppress the flow of the resist from the upper portion of the planarization film 207 to the opening region by increasing the thickness of the resist. As a result, the upper portion of the planarization film 207 can be covered with the resist. However, it is difficult to remove the resist having a large thickness, and it is also difficult to miniaturize the pattern. Further, applying the thick resist changes the concentration of the solvent in the resist depending on the thickness direction. For example, the concentration of the solvent is low at a surface of the resist, and high at a bottom surface. Since the resist becomes harder when the concentration of the solvent is low, it is difficult to remove the resist, and the resist becomes softer when the concentration of the solvent is high, so that the resist is easily removed. Therefore, in the case where the concentration of the solvent changes according to the thickness direction of the resist, the shape of the mask is deteriorated by exposing and developing the resist. If the concentration of the solvent contained in the resist is decreased when the resist is applied thickly, unevenness in the concentration of the solvent in the thickness direction of the resist is suppressed. It is possible to improve the shape of the resist by reducing the concentration of the solvent contained in the resist and extending the vacuum drying time after applying the resist. However, since the processing tact of the photolithography process becomes long, it is not suitable for mass production.

As described above, it is difficult to accurately form the resist mask on the upper portion of the processed planarization film having a large thickness. In addition, a defective shape of the resist mask may cause defective processing of the conductive film and the insulating film, which may cause a defective display of the display device.

Furthermore, in the case where an oxide semiconductor layer is used as the transistor in the display device, the transistor performance deteriorates when moisture contained in the planarization film 207 enters the oxide semiconductor layer. Therefore, moisture contained in the planarization film needs to be removed.

In the display device 10 according to an embodiment of the present invention, the planarization film 207 reduces parasitic capacitance between the gate wiring and the source wiring and the conductive layer 214 and improves the transmittance of the opening region. In this case, a protrusion part protruding above the surface of the transparent conductive layer arranged on the planarization film is arranged in the planarization film 207, and the protrusion part functions as a spacer. The protrusion part maintains the cell gap between the array substrate 150 and the counter substrate 152.

As a result, the spacers formed on the array substrate 150 and having the reduced effects of the unevenness of the conductive layer having various thicknesses can be contacted with the counter substrate 152. Therefore, it is possible to suppress the variations in the cell gap caused by the unevenness of the outermost surface of the array substrate 150. As a result, it is possible to improve the display quality of the display device. Further, the spacer forming step in the counter substrate 152 can be omitted.

In addition, since the protrusion part is arranged in the planarization film 207, even if the resist is applied, the resist is not applied to the upper portion of the protrusion part, and the resist is applied to regions other than the protrusion part. The upper portion of the protrusion part can be exposed from the conductive film or the insulating film by removing the conductive film or the insulating film on the upper portion of the protrusion part using such a resist mask. As a result, moisture contained in the planarization film 207 can be released from the upper portion of the exposed protrusion part during the heat treatment in the manufacturing process of the display device. As a result, it is possible to suppress moisture contained in the planarization film from entering the oxide semiconductor layer and to suppress deterioration of the characteristics of the transistor Tr.

In the following explanation, the region 250 where the gate wiring GL intersects the source wirings SL1 to SL4 will be described with reference to FIG. 8 to FIG. 13. In FIG. 8 to FIG. 13, the source wirings SL2 and SL4 are wirings of a column for driving the pixels PIX-A1 and PIX-A2, and the source wirings SL1 and SL3 are wirings of a column for driving the pixels PIX-B1 and PIX-B2.

Figure 8:
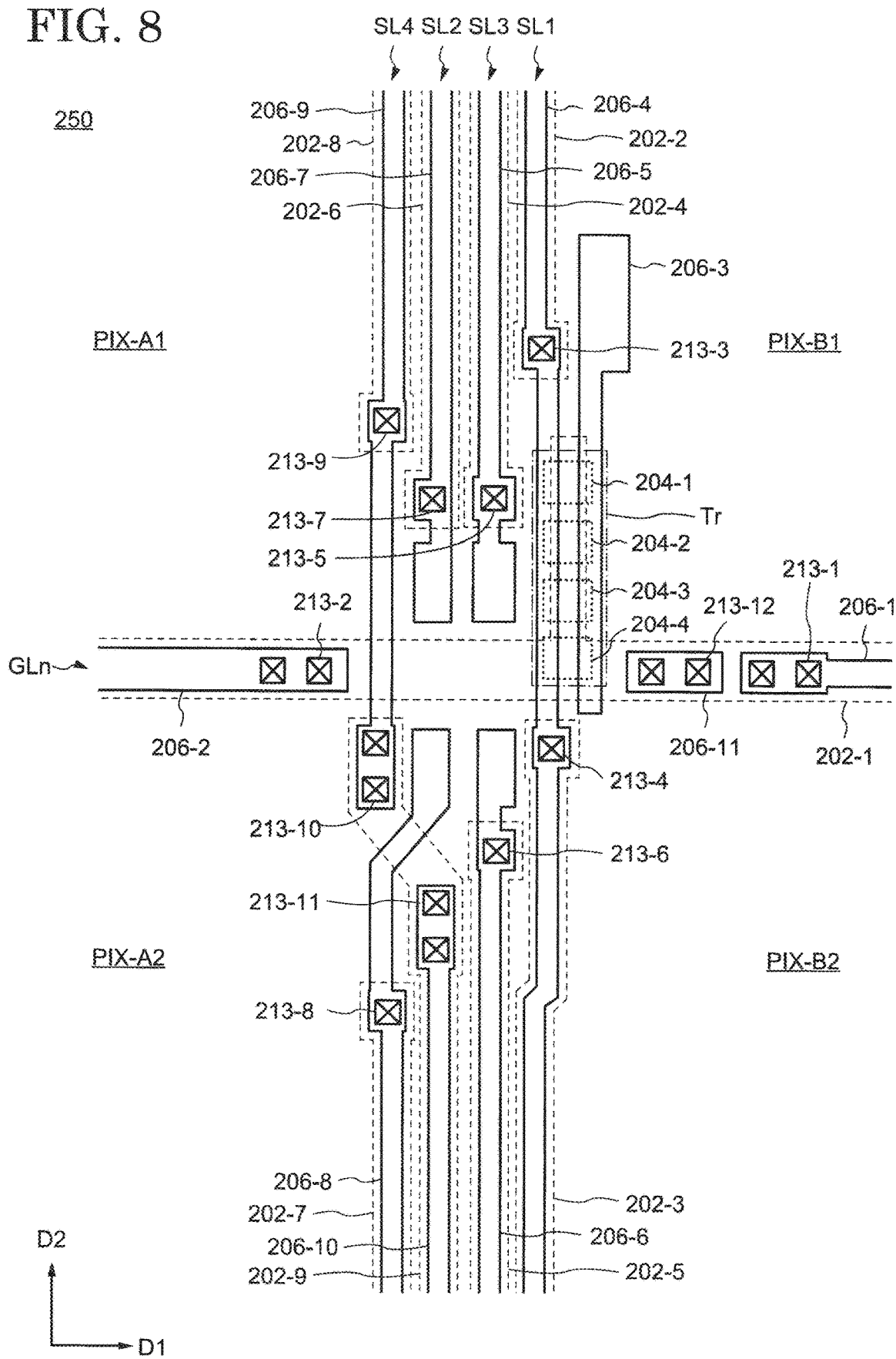
FIG. 8 is an enlarged diagram of a planar layout of pixels in a display device according to an embodiment of the present invention.

FIG. 8 is a planar layout of the conductive layers 202-1 to 202-9, the oxide semiconductor layers 204-1 to 204-4, and conductive layers 206-1 to 206-11 in the region 250. The conductive layers 202-1 to 202-9 are arranged above the array substrate 150. The conductive layer 202-1 has a region that extends in the direction D1 but branches in the direction D2. In addition, the conductive layers 202-2 to 202-9 extend in the direction D2. The oxide semiconductor layers 204-1 to 204-4 are arranged above the conductive layer 202-1 via the gate insulating film 203 (see FIG. 7). The oxide semiconductor layers 204-1 to 204-4 are arranged side by side in the direction D2. In the present embodiment, an example in which the five oxide semiconductor layers 204-1 to 204-4 are used to form the transistor Tr is shown. The oxide semiconductor layer may be separately arranged in the plurality of oxide semiconductor layers 204-1 to 204-4 to reduce the effect of heat generation. The number of oxide semiconductor layers is not particularly limited. In the oxide semiconductor layers 204-1 to 204-4, light guided from the conductive layer 202-1 side to the glass substrate (the array substrate 150) toward the oxide semiconductor layers 204-1 to 204-4 is reflected by the conductive layer 202-1, and light leakage is less likely to occur in the oxide semiconductor layers 204-1 to 204-4. The conductive layers 206-1 to 206-11 are arranged above the gate insulating film 203 and the oxide semiconductor layers 204-1 to 204-4. The conductive layers 206-1, 206-2, and 206-11 extend in the direction D1 and the conductive layers 206-3 to 206-10 extend in the direction D2.

The conductive layer 202-1 overlaps the conductive layers 206-1, 206-2, and 206-11. The conductive layer 202-1 is connected to the conductive layer 206-1 via a contact hole 213-1 arranged in the gate insulating film 203, and is connected to the conductive layer 206-2 via a contact hole 213-2 arranged in the gate insulating film 203. A region of the conductive layer 202-1 extending in the direction D1 functions as the gate wiring. In addition, a region of the conductive layer 202-1 extending in the direction D2 functions as the gate electrode.

The conductive layers 202-2 and 202-3 overlap the conductive layer 206-4. The conductive layer 202-2 is connected to the conductive layer 206-4 via a contact hole 213-3 arranged in the gate insulating film 203. The conductive layer 202-3 is connected to the conductive layer 206-4 via a contact hole 213-4 arranged in the gate insulating film 203. The conductive layer 206-4 intersects the conductive layer 202-1. The conductive layer 206-4 functions as the first source wiring SL1. In addition, a region of the conductive layer 206-4 that does not overlap the conductive layers 202-2 and 202-3 functions as a source electrode of the transistor Tr. The conductive layer 206-3 functions as a drain electrode of the transistor Tr.

The conductive layer 202-4 overlaps the conductive layer 206-5 and is connected to the conductive layer 206-5 via a contact hole 213-5 arranged in the gate insulating film 203. The conductive layer 202-5 overlaps the conductive layer 206-6 and is connected to the conductive layer 206-6 via a contact hole 213-6 arranged in the gate insulating film 203. The conductive layer 206-5 is connected to the conductive layer 206-6 via the conductive layer 208-2 (see FIG. 9). As a result, the conductive layer 206-5, the conductive layer 206-6, and the conductive layer 208-2 function as the third source wiring SL3.

The conductive layer 202-6 overlaps the conductive layer 206-7 and is connected to the conductive layer 206-7 via a contact hole 213-7 arranged in the gate insulating film 203. The conductive layer 202-7 overlaps the conductive layer 206-8 and is connected to the conductive layer 206-8 via a contact hole 213-8 arranged in the gate insulating film 203. The conductive layer 206-7 is connected to the conductive layer 206-8 via the conductive layer 208-3 (see FIG. 9). The conductive layer 206-7, the conductive layer 206-8, and the conductive layer 208-3 function as the second source wiring SL2.

The conductive layer 202-8 overlaps the conductive layer 206-9 and is connected to the conductive layer 206-9 via a contact hole 213-9 arranged in the gate insulating film 203. The conductive layer 202-9 overlaps the conductive layer 206-9 and the conductive layer 206-10. The conductive layer 202-9 is connected to the conductive layer 206-9 via a contact hole 213-10 arranged in the gate insulating film 203. The conductive layer 202-9 is connected to the conductive layer 206-10 via a contact hole 213-11 arranged in the gate insulating film 203. The conductive layer 206-9 has a region that intersects the conductive layer 202-1. The conductive layer 206-9 and the conductive layer 206-10 function as the fourth source wiring SL4.

In addition, the conductive layer 202-1 overlaps the conductive layer 206-11 and is connected to the conductive layer 206-11 via a contact hole 213-12 arranged in the gate insulating film 203.

The conductive layer 202-9 and the conductive layer 206-8 have a bent region. The conductive layer 202-9 has a region that overlaps and intersects the conductive layer 206-8. That is, the second source wiring SL2 and the fourth source wiring SL4 have a region intersecting each other.

Although not described in detail, as shown in FIG. 6, the conductive layer 202-2 and the conductive layer 206-5 have a bent region. The conductive layer 202-2 has a region that overlaps and intersects the conductive layer 206-5. That is, the first source wiring SL1 has a region that intersects the third source wiring SL3.

As shown in FIG. 8, the gate wiring GLn is formed by stacking the conductive layer 202-1 and the conductive layers 206-1 and 206-2. The conductive layer 202-1 extends along the direction D1. The gate wiring GLn is only the conductive layer 202-1 in a region where the source wirings SL1 to SL4 intersect, and the conductive layer 206-1 and the conductive layer 206-2 are separated from each other. In addition, the source wiring SL1 is formed by stacking the conductive layers 202-2 and 202-3 and the conductive layer 206-4. In the source wiring SL1, in a region that intersects the gate wiring GLn, only the conductive layer 206-4 is arranged, and the conductive layer 202-2 and the conductive layer 202-3 are separated from each other. As a result, even if static electricity is generated in the manufacturing process of the display region 12 and the peripheral region 14 in the array substrate 150, the static electricity can be released, and the generation of defects caused by the static electricity can be suppressed.

Figure 9:
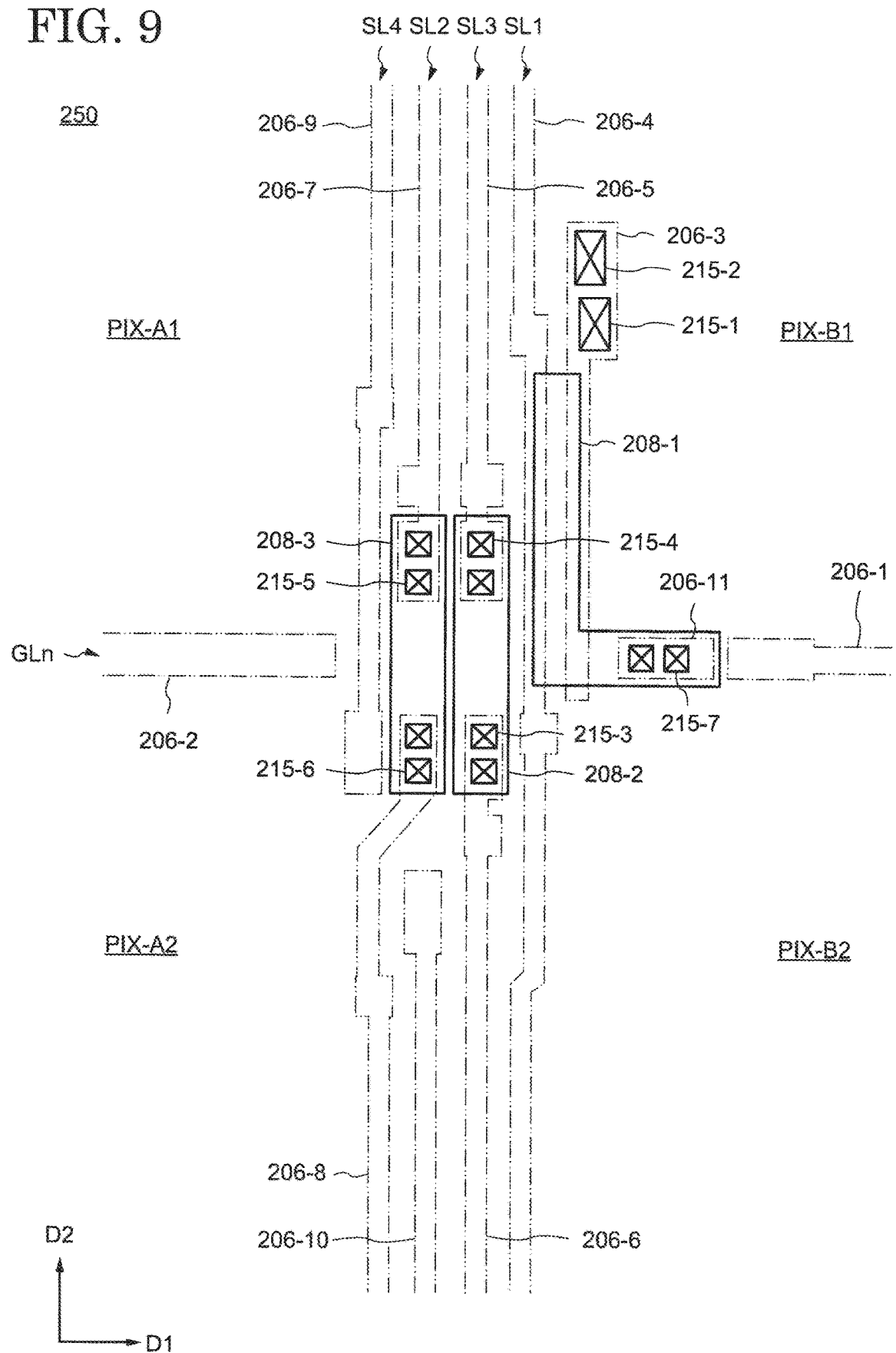
FIG. 9 is an enlarged diagram of a planar layout of pixels in a display device according to an embodiment of the present invention.

FIG. 9 is a planar layout of the conductive layers 206-1 through 206-11 and the conductive layers 208-1 to 208-3 in the region 250. The conductive layers 206-1 to 206-11 are as described in FIG. 8. The conductive layers 208-1 to 208-3 are arranged above the insulating film 205 (see FIG. 7). The conductive layer 208-1 has a region extending in the direction D2 and a region extending in the direction D1. The region extending in the direction D2 overlaps the oxide semiconductor layers 204-1 to 204-4. In addition, the region extending in the direction D1 overlaps the conductive layer 206-11 and is connected to the conductive layer 206-11 via a contact hole 215-7 arranged in the insulating film 205. The conductive layer 208-2 extends in the direction D2. The conductive layer 208-2 overlaps the conductive layer 206-5 and the conductive layer 206-6, and is connected to the conductive layer 206-5 and the conductive layer 206-6 via contact holes 215-3 and 215-4 arranged in the insulating film 205. The conductive layer 208-3 extends in the direction D2. The conductive layer 208-3 overlaps the conductive layer 206-7 and the conductive layer 206-8, and is connected to the conductive layer 206-7 and the conductive layer 206-8 via contact holes 215-5 and 215-6 arranged in the insulating film 205.

Figure 10:
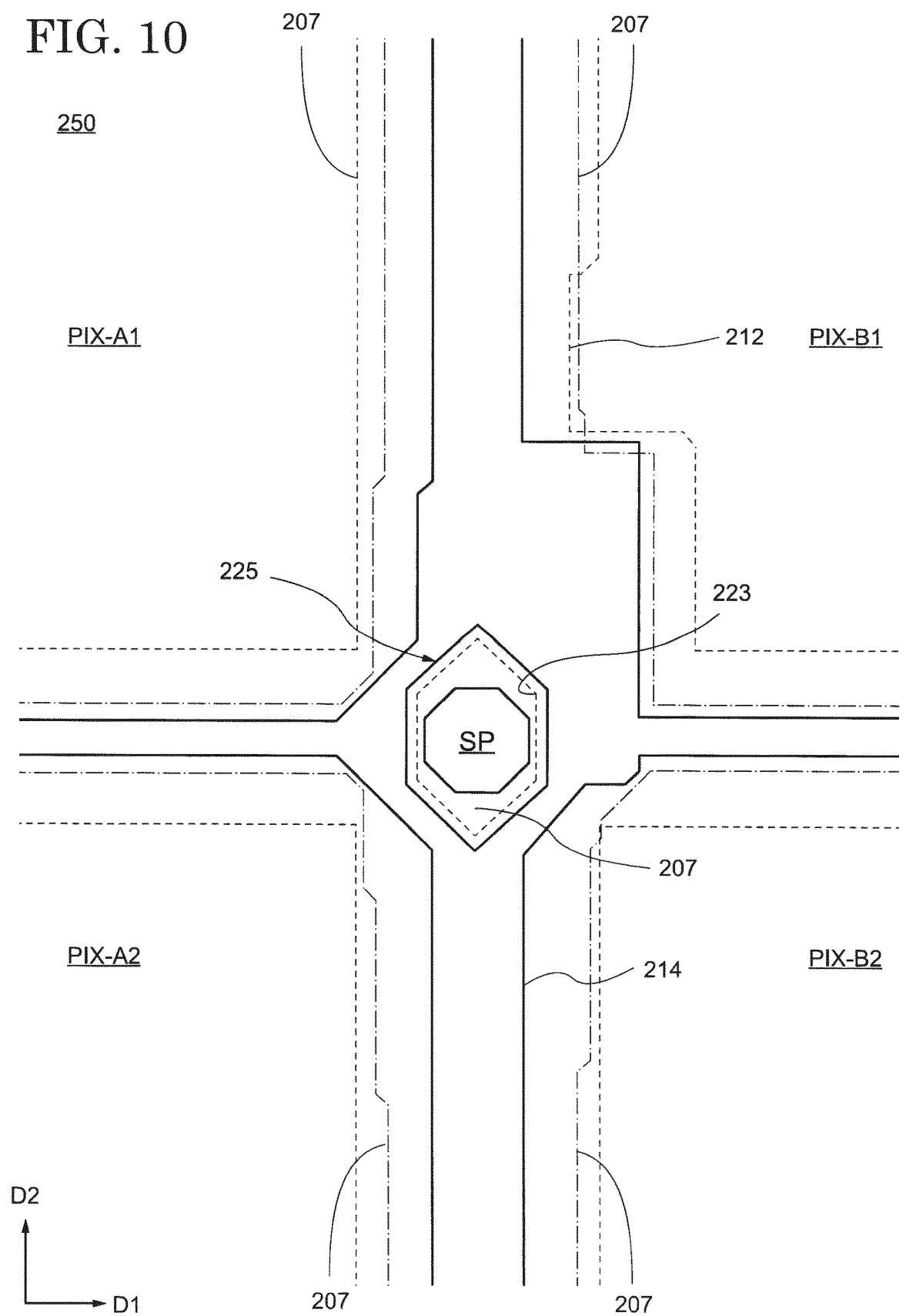
FIG. 10 is an enlarged diagram of a planar layout of pixels in a display device according to an embodiment of the present invention.

FIG. 10 is a planar layout of the planarization film 207, the transparent conductive layer 212, and the conductive layer 214 in the region 250. The planarization film 207 has been removed in the opening regions of the pixels PIX1 to PIX4 as shown in FIG. 7. That is, the planarization film 207 is arranged above the wiring region. The transparent conductive layer 212 is arranged above the planarization film 207. In addition, the conductive layer 214 is arranged above the transparent conductive layer 212. The transparent conductive layer 212 and the conductive layer 214 function as the capacitance wiring CW. The transparent conductive layer 212 is arranged above the conductive layers 206-1 to 206-11 via the planarization film 207. Therefore, since the source wirings SL1 to SL4 and the capacitance wiring CW are arranged so as to be separated from each other, it is less likely to be affected by the potential from the capacitance wiring CW. In addition, the electrical resistance of the conductive layer 214 is smaller than the electrical resistance of the transparent conductive layer 212. Therefore, variation in the potential of the capacitance wiring CW due to the position where the pixel PIX is located in the display region 12 is suppressed. In addition, the transparent conductive layer 212 has an opening 223 and the conductive layer 214 has an opening 225. The opening 223 and the opening 225 are arranged so as to overlap each other. The planarization film 207 is exposed and the spacer SP is arranged inside the opening 223.

The transparent conductive layer 212 and the conductive layer 214 are arranged in a grid pattern so as to cover the gate wiring GLn and the source wirings SL1 to SL4. This reduces the storage capacitance C between the region without the transparent conductive layer 212 and the pixel electrode 216. The storage capacitor C is adjusted by the size of the region without the transparent conductive layer 212. In addition, the transparent conductive layer 212 may not be in the grid pattern, but may be arranged on the entire surface. In addition, the conductive layer 214 is arranged so as to cover the transistor Tr. As a result, optical leakage of the transistor Tr can be suppressed.

Although an example in which the conductive layer 214 is arranged above the transparent conductive layer 212 is shown, it may be arranged below the transparent conductive layer 212. The conductive layer 214 may be stacked with the transparent conductive layer 212. The conductive layer 214 has a light-shielding effect. Therefore, the wiring region can be shielded from light. A width of the conductive layer 214 is arranged so as to be larger than a combined width of the source wirings SL1 to SL4 in a plan view. In addition, the width of the conductive layer 214 is arranged so as to be larger than a width of the gate wiring GL in a plan view. As a result, it is possible to suppress a display panel 11 from emitting the reflected light reflected by the edges of the source wirings SL1 to SL4. In addition, the width of the conductive layer 214 or the combined width of the source wirings SL1 to SL4 refer to lengths in the direction (direction D1) intersecting the direction in which the source wirings SL1 to SL4 extend. Further, the width of the gate wiring GL refers to a length in the direction (direction D2) intersecting the direction in which the gate wiring GL extends.

Figure 11:
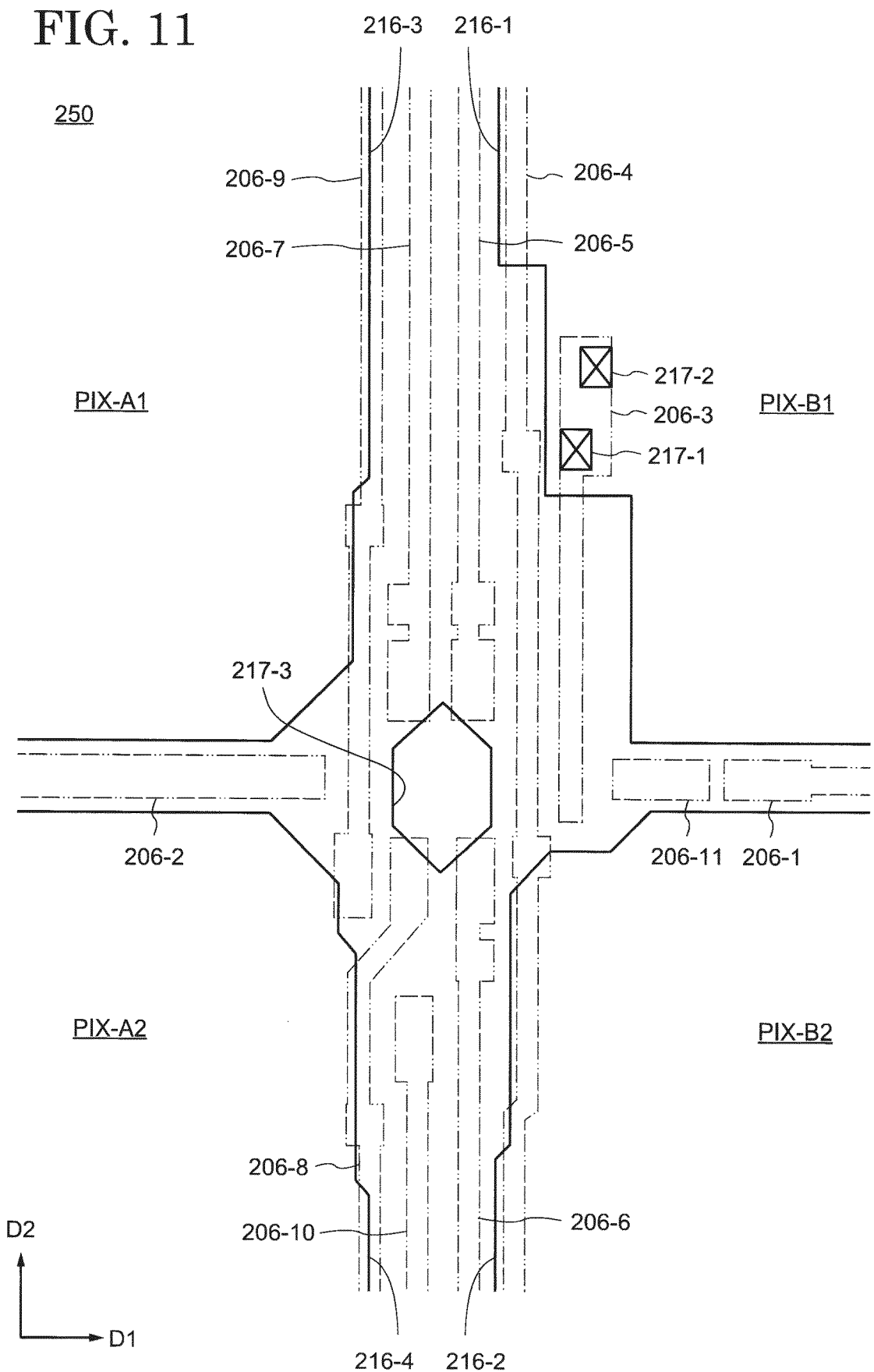
FIG. 11 is an enlarged diagram of a planar layout of pixels in a display device according to an embodiment of the present invention.

FIG. 11 is a planar layout of the conductive layers 206-1 to 206-11 and the pixel electrodes 216-1 to 216-4 in the region 250. The conductive layers 206-1 to 206-11 are as described in FIG. 8. The pixel electrodes 216-1 to 216-4 are arranged above the insulating film 209. The pixel electrodes 216-1 to 216-4 are arranged in the opening region of the pixel PIX. The pixel electrode 216-1 is connected to the conductive layer 206-3 via contact holes 217-1 and 217-2 arranged in the insulating film 209 and contact holes 215-1 and 215-2 (see FIG. 9) arranged in the insulating film 205. In addition, the insulating film 209 has a contact hole 217-3. The contact hole 217-3 is arranged so as to overlap the opening 223 and the opening 225 (see FIG. 10). The openings 223, 225, and 217-3 on the planarization film 207 allow moisture contained in the planarization film 207 to be released from the exposed planarization film 207.

The conductive layer 202 and the conductive layer 206 are arranged so as to be stacked on each other as the gate wirings GL1 to GL4 and the source wirings SL1 to SL4 in the display region 12. Since the source wirings SL1 to SL4 are arranged so that the conductive layer 202 and the conductive layer 206 are stacked and extended, resistance of the source wirings SL1 to SL4 can be made uniform and wiring capacitance can be made uniform. In addition, the source wiring SL1 and the source wiring SL3 can be arranged to intersect each other, and the source wiring SL2 and the source wiring SL4 can be arranged to intersect each other.

Figure 12:
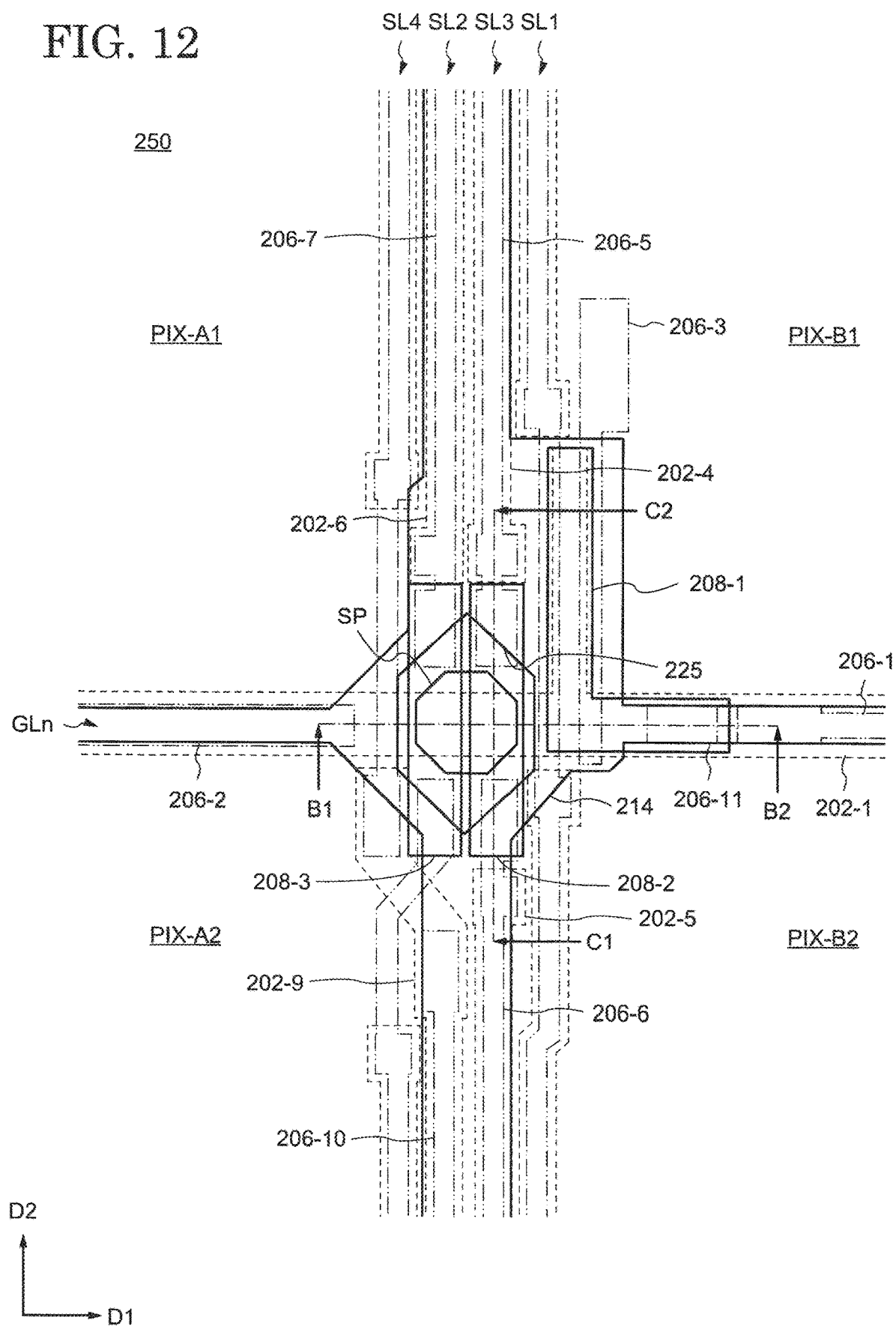
FIG. 12 is an enlarged diagram of a planar layout of pixels in a display device according to an embodiment of the present invention.
Figure 13:
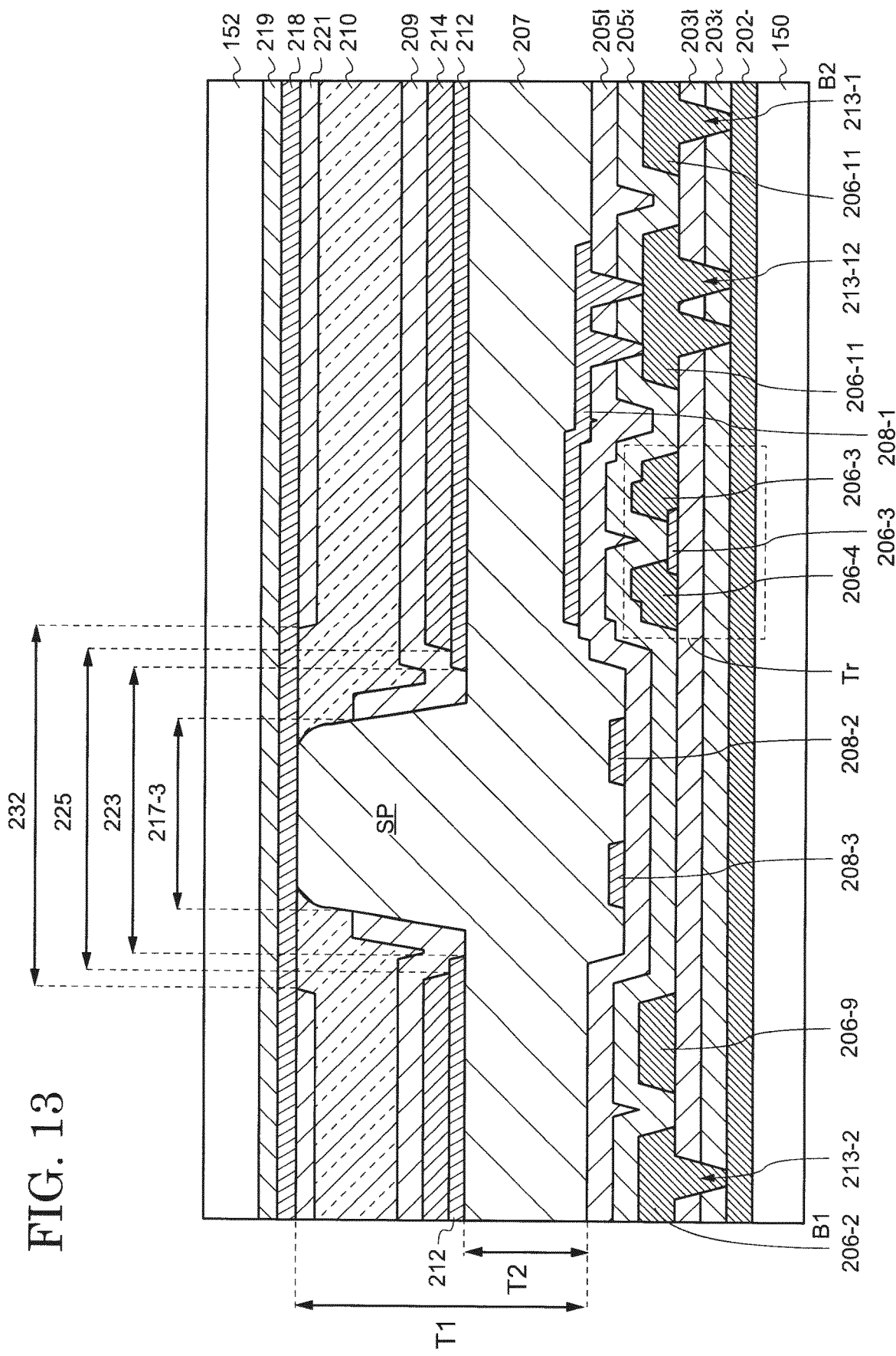
FIG. 13 is a cross-sectional view at a line B1-B2 shown in FIG. 12 in a display device according to an embodiment of the present invention.
Figure 14:
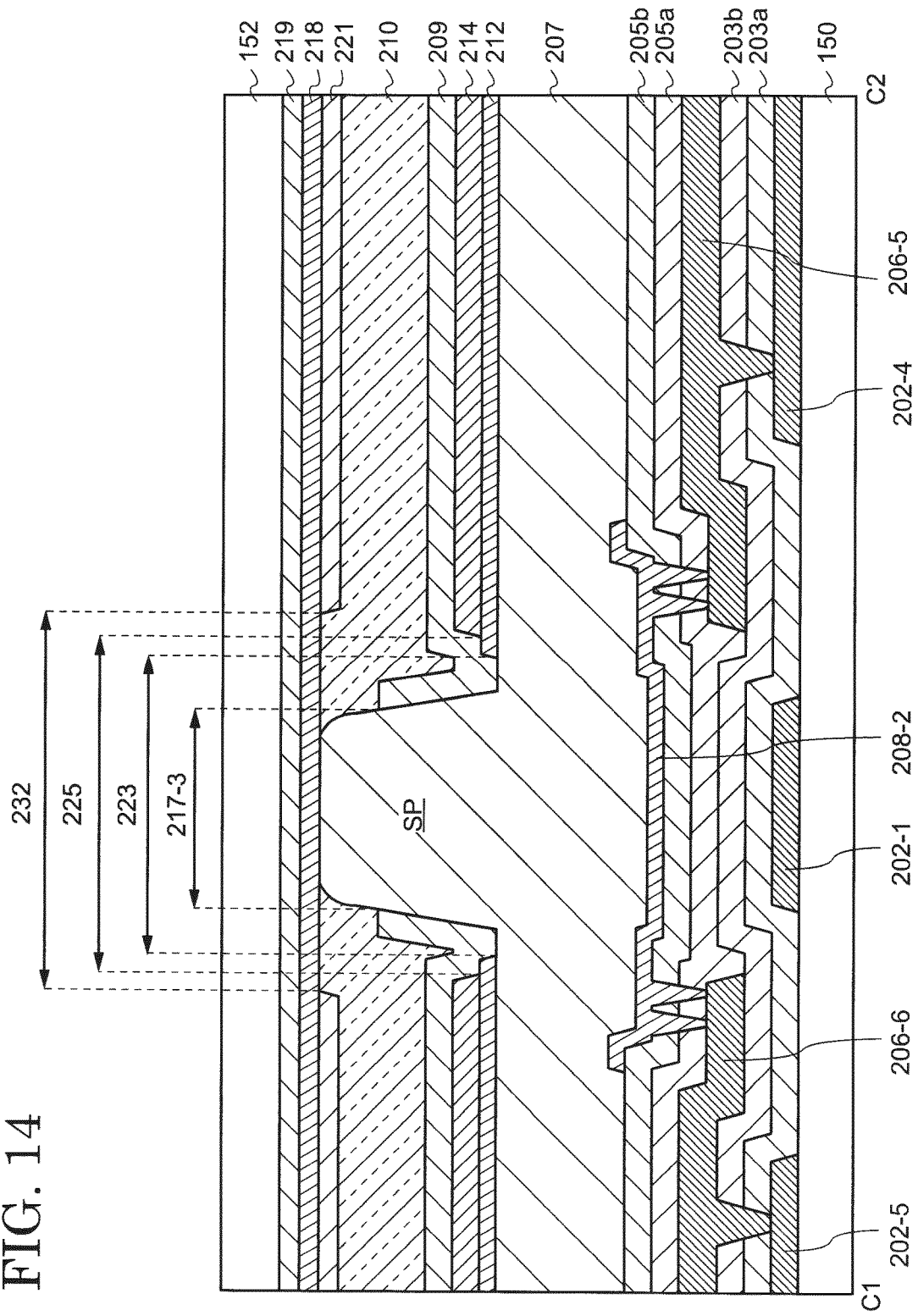
FIG. 14 is a cross-sectional view at a line C1-C2 shown in FIG. 12 in a display device according to an embodiment of the present invention.

FIG. 12 is a diagram in which the conductive layer 202, the conductive layer 206, the conductive layer 208, the conductive layer 214, and the spacer SP in the region 250 overlap. FIG. 13 is a cross-sectional view at a line B1-B2 shown in FIG. 12 in the display region. FIG. 14 shows a cross-sectional view at the C1-C2 line shown in FIG. 12 in the display region. At the intersection of the gate wiring GLn and the source wiring SL where the spacer SP is placed, the gate wiring GLn is composed of the conductive layer 202-1 with a thick film thickness, while the source wiring SL is composed of the conductive layers 208-2 and 208-3 with a thin film thickness compared to the conductive layer 202 and conductive layer 206, without providing a conductive layer with a thick film thickness. The source wiring SL is composed of conductive layers 208-2 and 208-3, which are thinner than the conductive layers 202 and 206. This allows the gate wiring GL and the source wiring SL to cross each other without the thick conductive layers crossing each other.

As shown in FIG. 13 and FIG. 14, the spacer SP is arranged in the region where the conductive layer 202-1 intersects the conductive layers 208-2 and 208-3. The spacer SP is part of the planarization film 207 and is arranged so that part of the planarization film 207 protrudes upward from the surface of the transparent conductive layer 212. The opening 223 is arranged to surround the spacer SP in the transparent conductive layer 212. The opening 225 is arranged to surround the spacer SP in the conductive layer 214. In this case, an end portion of the opening 225 is located outside of an end portion of the opening 223. The opening 217-3 is arranged to surround the spacer SP in the insulating film 209. The insulating film 209 is in contact with a side surface of the spacer SP. In this case, an area of the opening 217-3 is smaller than an area of the openings 223 and 225. In the planarization film 207, a thickness from a surface of the nitride insulating film 205b to the upper surface of the protrusion part is defined as a thickness T1. In addition, a thickness from the surface of the nitride insulating film 205b to the transparent conductive layer 212 is defined as a thickness T2. The thickness T1 is about 3 μm, and the thickness T2 is about 2 μm.

The spacer SP is arranged to be in contact with a surface of the counter substrate 152. The spacer SP may be in contact with the counter substrate 152 via a conductive film or an insulating film. The light-shielding layer 219 is arranged in the counter substrate 152. The common electrode 218 is arranged in contact with the light-shielding layer 219. In addition, the insulating film 221 is arranged in contact with the common electrode 218. The opening 232 is arranged in the insulating film 221. The opening 232 is arranged in the insulating film 221, and the common electrode 218 is in contact with the spacer SP inside the opening 232, so that the adhesion between the spacer SP and the common electrode 218 can be improved. In addition, an area of the opening 232 may be larger than the area of the opening 217-3.

As shown in FIG. 8 and FIG. 12, the source wiring SL3 has a region where the conductive layer 202-4 overlaps the conductive layer 206-5 and a region where the conductive layer 202-5 overlaps the conductive layer 206-6. The conductive layer 206-5 is connected to the conductive layer 202-4 via the contact hole 213-5 arranged in the gate insulating film 203. The conductive layer 206-6 is connected to the conductive layer 202-5 via the contact hole 213-6 arranged in the gate insulating film 203. In this case, the spacer SP is preferably arranged in a region that does not overlap the conductive layers 206-5, 206-6, 206-7, and 206-8.

Further, the spacer SP does not overlap the transistor Tr of the pixel PIX-B1 adjacent to the region where the conductive layer 202-1 intersects the conductive layers 208-2 and 208-3. The transistor Tr is composed of the gate wiring GLn, the source wiring SL1, the conductive layer 206-3 (drain electrode), and the oxide semiconductor layer 204. Therefore, when the gate wiring GLn, the source wiring SL1, and the oxide semiconductor layer 204 overlap each other, unevenness occurs on the surface of the planarization film 207 arranged on the transistor Tr. Since the spacer SP is not arranged on the transistor Tr, variations in the cell gap can be reduced.

Although the example in which the plurality of spacers SP is arranged for all intersections of the pixels arranged in a matrix has been described in the present embodiment, an embodiment of the present invention is not limited to this. The plurality of spacers SP may be arranged so as to have regularity with respect to the intersections of the pixels arranged in a matrix. For example, the spacer SP may be regularly arranged so as to be arranged at one of the plurality of intersections. In addition, the spacer SP may be arranged in the region other than the intersection of the pixels. A height of the plurality of spacers SP may be the same height, or a spacer SP having a different height among the plurality of spacers SP may be arranged. For example, the main spacer SP contacting the counter substrate 152 side and a sub-spacer SP having a height smaller than the cell gap may be arranged.

[Peripheral Region]

Next, a spacer arranged in the peripheral region 14 of the display device 10 will be described with reference to FIG. 15 and FIG. 16.

Figure 15:
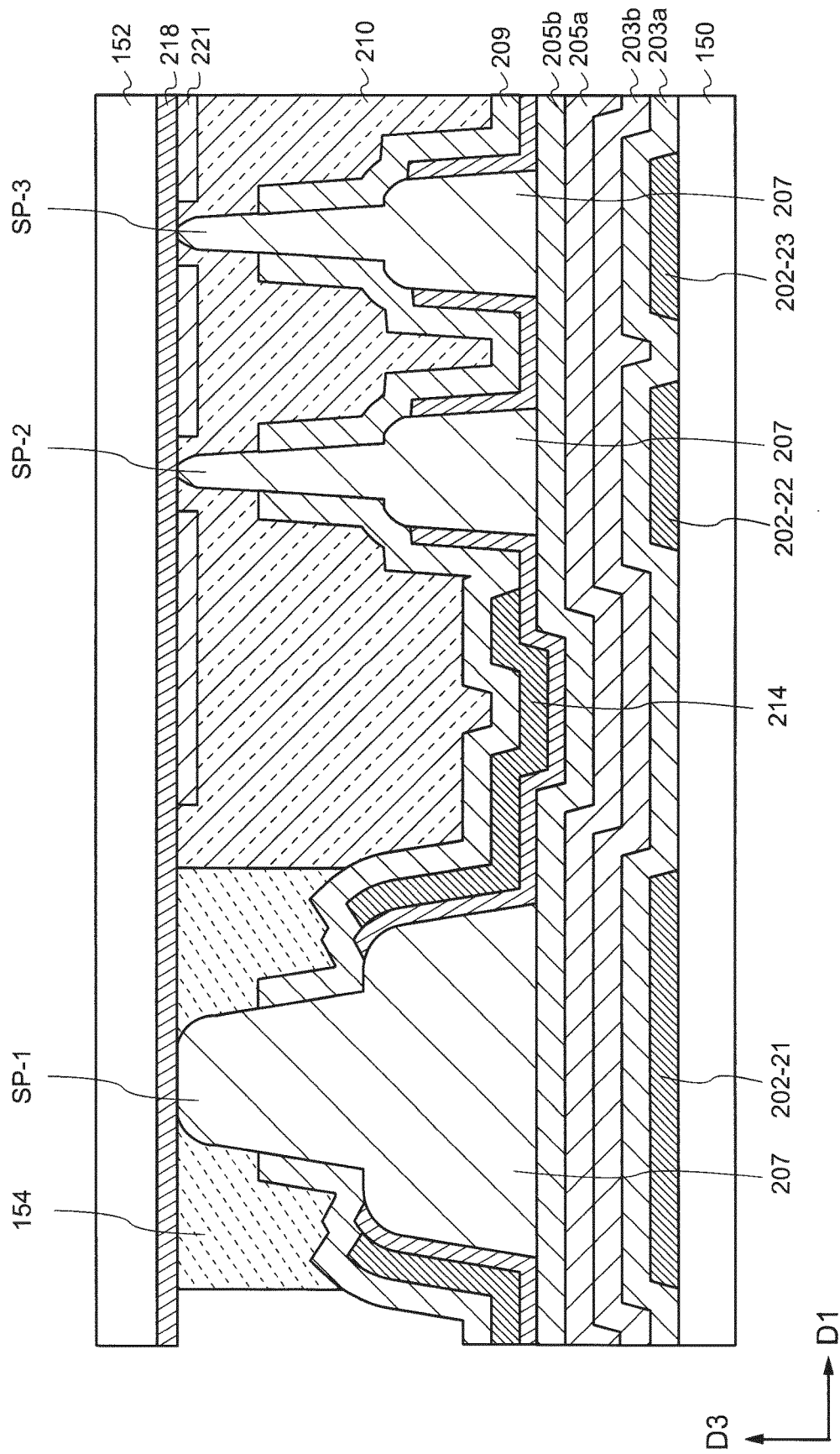
FIG. 15 is a cross-sectional view near a seal material of a peripheral region in a display device according to an embodiment of the present invention.

FIG. 15 is a cross-sectional view of the display device 10 when the seal material 154 arranged in the vicinity of the common wiring area 22 is cut in the direction D1 in the peripheral region 14.

In FIG. 15, conductive layers 202-21, 202-22, and 202-23 are arranged on the array substrate 150. The nitride insulating film 203a, the oxide insulating film 203b, the oxide insulating film 205a, and the nitride insulating film 205b are arranged on the conductive layers 202-21, 202-22, and 202-23. The planarization film 207 is arranged in a region overlapping the conductive layers 202-21, 202-22, and 202-23, and protrusion parts functioning as spacers SP-1, SP-2, and SP-3 are arranged in the planarization film 207. Each of the spacers SP-1 to SP-3 protrudes beyond the surface of the transparent conductive layer 212. An opening of the transparent conductive layer 212 is arranged so as to surround the spacer SP-1 of the planarization film 207, and an opening of the conductive layer 214 is arranged. In addition, an opening is arranged in the transparent conductive layer 212 so as to surround the spacer SP-2, and an opening is arranged in the transparent conductive layer 212 so as to surround the spacer SP-3. The spacers SP-1, SP-2, and SP-3 are in contact with the common electrode 218. The spacer SP-1 is arranged at a position where the seal material 154 is arranged.

Figure 16:
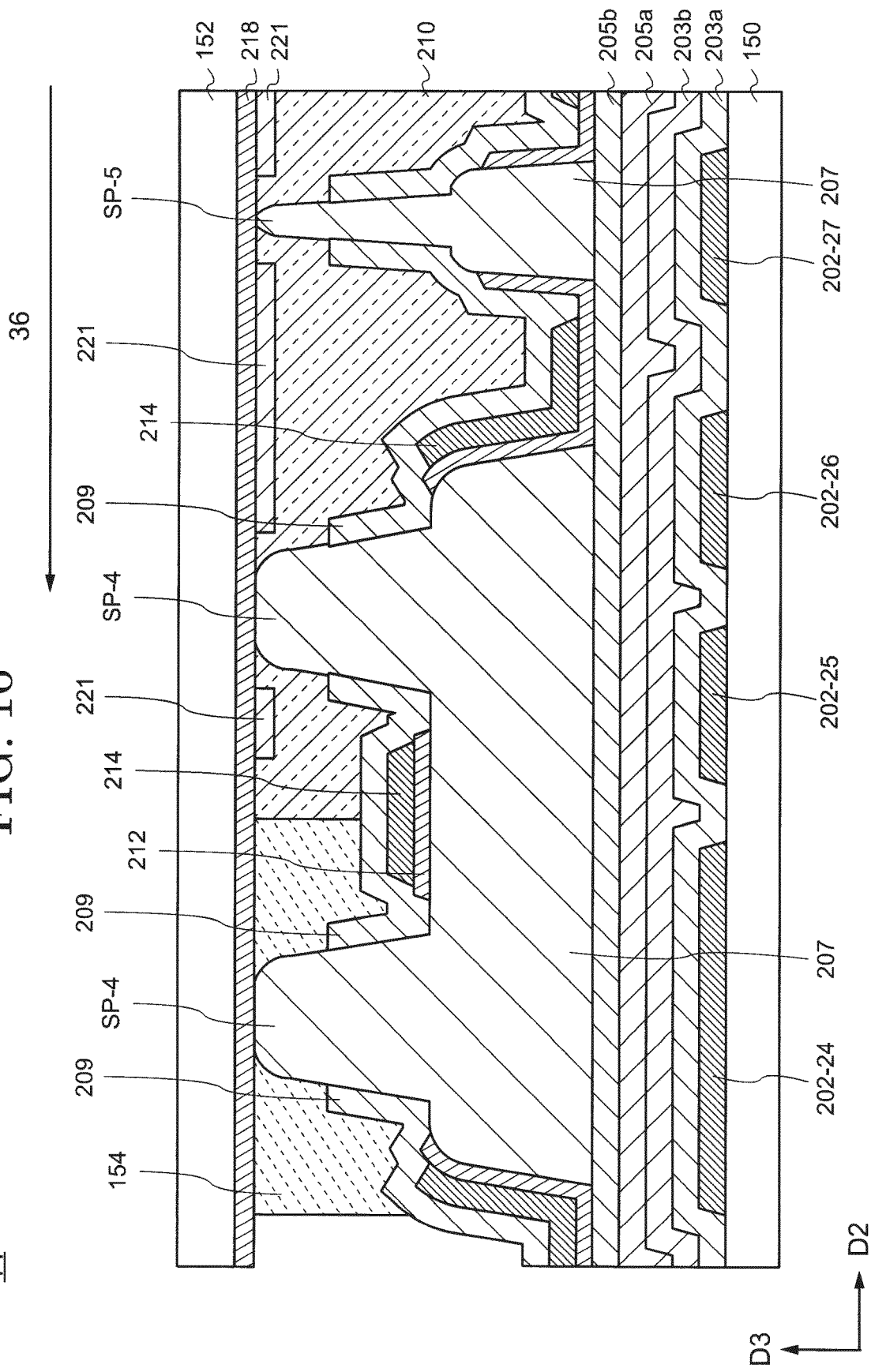
FIG. 16 is a cross-sectional view near a seal material of a peripheral region in a display device according to an embodiment of the present invention.

FIG. 16 is a cross-sectional view of the display device 10 when the seal material 154 arranged in the vicinity of the terminal portion 36 is cut in the direction D2 in the peripheral region 14.

In FIG. 16, conductive layers 202-24, 202-25, 202-26, and 202-27 are arranged on the array substrate 150. The nitride insulating film 203a, the oxide insulating film 203b, the oxide insulating film 205a, and the nitride insulating film 205b are arranged on the conductive layers 202-24, 202-25, 202-26, and 202-27. A difference from the planarization film 207 shown in FIG. 15 is that the planarization film 207 is arranged so as to overlap the plurality of conductive layers 202-24, 202-25, and 202-26. In addition, protrusion parts functioning as a spacer SP-4 and a spacer SP-5 are arranged in the planarization film 207 overlapping the conductive layers 202-24 to 202-26. Each of the spacer SP-4 and the spacer SP-5 protrudes upward from the surface of the transparent conductive layer 212. Two openings are arranged in the transparent conductive layer 212 so as to surround the spacers SP-4 and SP-5 of the planarization film 207, and two openings are arranged in the conductive layer 214. A protrusion part functioning as the spacer SP-5 is arranged in the planarization film 207 overlapping the conductive layer 202-27. An opening is arranged in the transparent conductive layer 212 so as to surround the spacer SP-5.

In FIG. 15 and FIG. 16, the planarization film 207, the transparent conductive layer 212, and the conductive layer 214 are arranged in a lattice pattern on various wirings. The planarization film 207 may be formed in one layer or may be divided into a plurality of layers on the array substrate 150. Similarly, each of the transparent conductive layer 212 and the conductive layer 214 may be formed in one layer or may be divided into a plurality of layers.

Although the case where the spacers SP arranged in the peripheral region are formed to substantially the same height has been described in the present embodiment, the present embodiment is not limited to this. The spacer SP having a different height among the plurality of spacers SP may be arranged in the peripheral region. For example, the main spacer SP contacting the counter substrate 152 side and a sub-spacer SP having a height smaller than the cell gap may be arranged.

Usually, a display device is manufactured using a large mother substrate. In this case, a plurality of display regions are formed on the mother substrate, and then a seal material is applied and bonded to a counter substrate. After that, the individual display panels are cut out by cutting the mother substrate and the counter substrate between the adjacent display regions. In this case, a planarization film and a protrusion part are formed by using an organic resin along a cut line for cutting the mother substrate and the counter substrate. Both the planarization film and the protrusion part arranged along the cut line are, for example, line-shaped. Alternatively, the planarization film may be line-shaped, and the protrusion part may be dot-shaped. Arranging the planarization film and the protrusion part along the cut line serves as a liquid crystal contamination barrier wall.

[Method for Forming Planarization Film and Spacer]

Next, a method for manufacturing a display device according to an embodiment of the present invention will be described with reference to FIG. 17A to FIG. 20B. Specifically, a method for forming the planarization film 207 and the spacer SP to form the transparent conductive layer 212, the conductive layer 214, the insulating film 209, and the pixel electrode 216 will be described. First, a method for forming the planarization film 207 and the spacer SP using an organic resin will be described with reference to FIG. 17A and FIG. 18A.

FIG. 17A to FIG. 18A are diagrams describing a process of performing multi-gradation exposure by applying an organic resin 242 that becomes the planarization film 207 on the array substrate 150. A conductive layer, an insulating film, and an oxide semiconductor layer arranged below the organic resin 242 are omitted from the drawings. As shown in FIG. 17A, the organic resin 242 is applied on the array substrate 150. A positive organic resin is used as the organic resin 242 functioning as the planarization film 207. The positive organic resin softens by irradiation with light (mainly ultraviolet rays). In this case, a thickness of the organic resin 242 is about 3.0 µm.

As shown in FIG. 17B, a multi-gradation mask 240 is used to expose the organic resin 242. A gray tone mask or a halftone mask may be used as the multi-gradation mask 240. The gray tone mask includes a light-shielding portion, a transmission portion, and a gray tone portion. The gray tone portion has a function of adjusting the amount of light transmission by arranging a slit having a resolution equal to or less than the resolution of the exposure apparatus. The halftone mask has a function of adjusting the amount of light transmission by a semi-transparent film. An unexposed region 244, a middle-exposed region 246, and an exposed region 248 can be formed on the organic resin 242 by performing exposure using the multi-gradation mask 240. In this case, the unexposed region 244 corresponds to the region where the spacer SP is formed, and the middle-exposed region 246 corresponds to the region where the planarization film 207 is formed. A thickness of 25% or more and 30% or less is exposed from the surface of the organic resin 242 in the middle-exposed region 246.

Figure 18A:
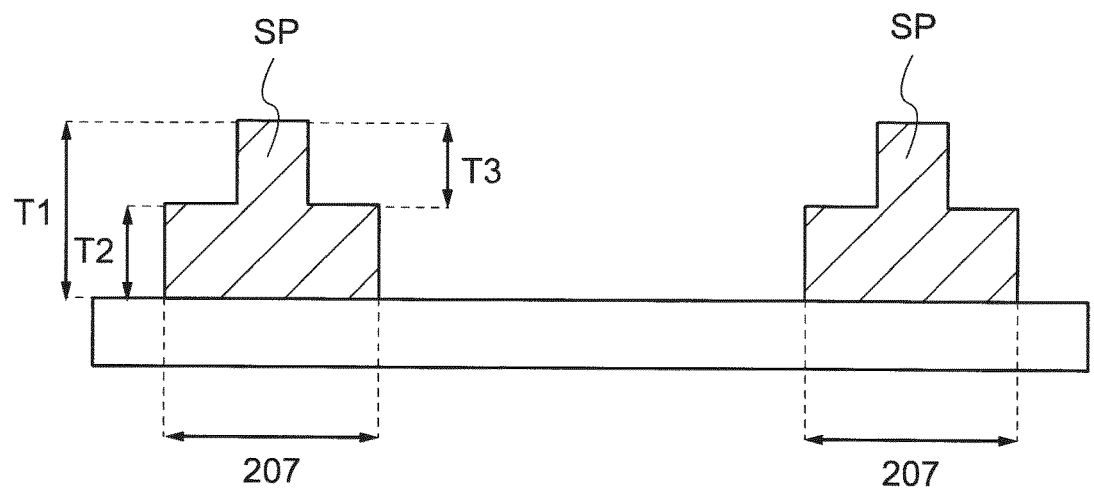
FIG. 18A is a diagram illustrating a method for manufacturing a display device according to an embodiment of the present invention.

Next, by developing the exposed organic resin 242, the organic resin in the middle-exposed region 246 and the organic resin of the exposed region 248 can be removed. As a result, as shown in FIG. 18A, the spacer SP having a part protruding from the planarization film 207 can be formed. In this case, in the planarization film 207, the thickness T1 is about 3 µm, the thickness T2 of the region covering the gate wiring GL and the source wiring SL is about 2 µm, and a thickness T3 of the protrusion part functioning as the spacer SP is about 1 µm.

In an embodiment of the present invention, the method for forming the planarization film 207 and the spacer SP is not limited to the method using the multi-gradation masking 240. For example, exposure may be performed twice such that the organic resin 242 may be exposed by a mask having an opening corresponding to the shape of the spacer, and then exposed by the mask having an opening corresponding to the shape of the planarization film. Alternatively, after the planarization film 207 is formed using the first layer of organic resin, two photolithography steps such that a second layer of organic resin is further coated on the planarization film 207 and a spacer is formed on the planarization film 207 using the second layer of organic resin may be performed.

Next, a method for forming the transparent conductive layers 212 to the pixel electrode 216 will be described with reference to FIG. 18B and FIG. 20B.

Figure 18B:
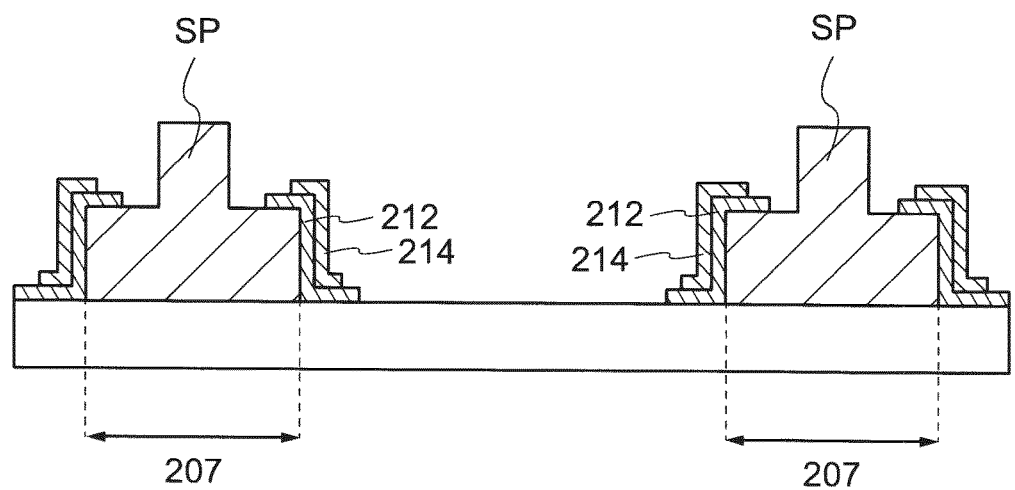
FIG. 18B is a diagram illustrating a method for manufacturing a display device according to an embodiment of the present invention.

FIG. 18B is a diagram illustrating a process of forming the transparent conductive layer 212 and the conductive layer 214. First, the transparent conductive layer 212 is formed on the insulating film 205 and the planarization film 207. An opening is formed in the transparent conductive layer 212 so as to surround the spacer SP. The conductive layer 214 is formed on the transparent conductive layer 212. An opening is formed in the conductive layer 214 so as to surround the spacer SP. In addition, after the transparent conductive layer 212 is formed, a heat treatment may be performed in a state where a conductive film is formed, or a heat treatment may be performed after the conductive layer 214 is formed by etching the conductive film. Moisture can be released from the region where the planarization film 207 is exposed.

Figure 19A:
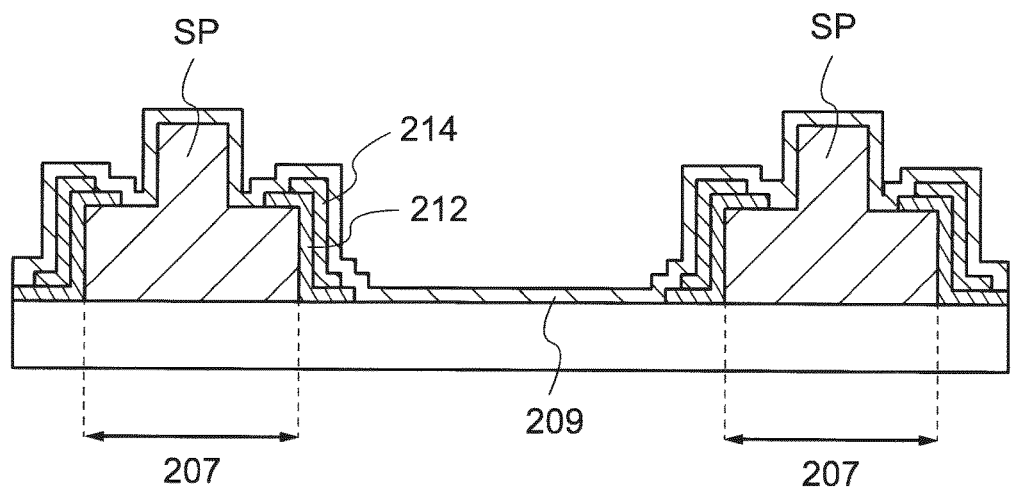
FIG. 19A is a diagram illustrating a method for manufacturing a display device according to an embodiment of the present invention.

FIG. 19A is a diagram illustrating a process of forming the insulating film 209 so as to cover the transparent conductive layer 212, the conductive layer 214, and the spacer SP. The insulating film 209 is formed so as to cover the side surface and the upper portion of the spacer SP. Although not shown, the insulating film 209 has a region in contact with the insulating film 205. In other words, the insulating film 209 is in contact with the insulating film 205 in the opening region of the pixel.

Figure 19B:
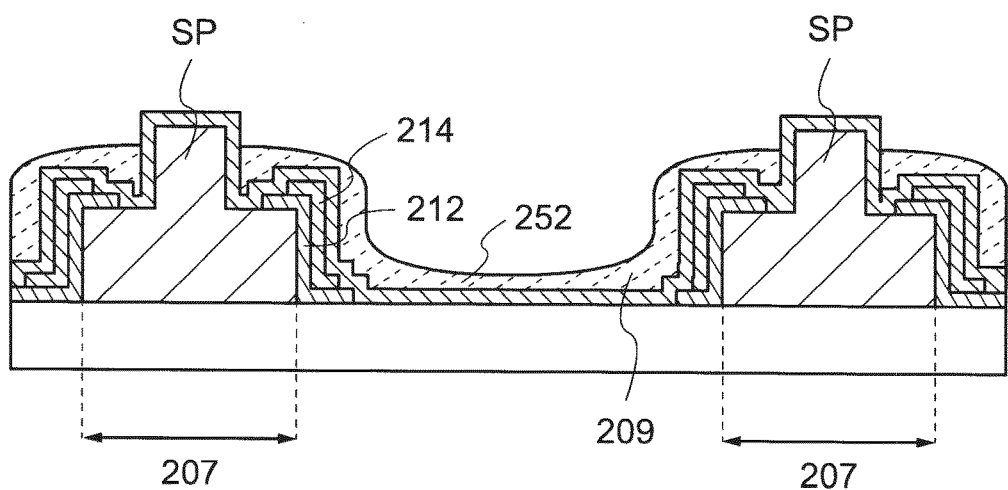
FIG. 19B is a diagram illustrating a method for manufacturing a display device according to an embodiment of the present invention.

FIG. 19B is a diagram illustrating a process of forming a resist mask 252 on the insulating film 209. As described above, depending on the thickness of the resist mask 252, there may be a region where the upper portion of the insulating film 209 is not formed and a region where it is formed. In the present embodiment, the resist mask 252 formed on the spacer SP is removed to expose the insulating film 209 on the spacer SP.

Figure 20A:
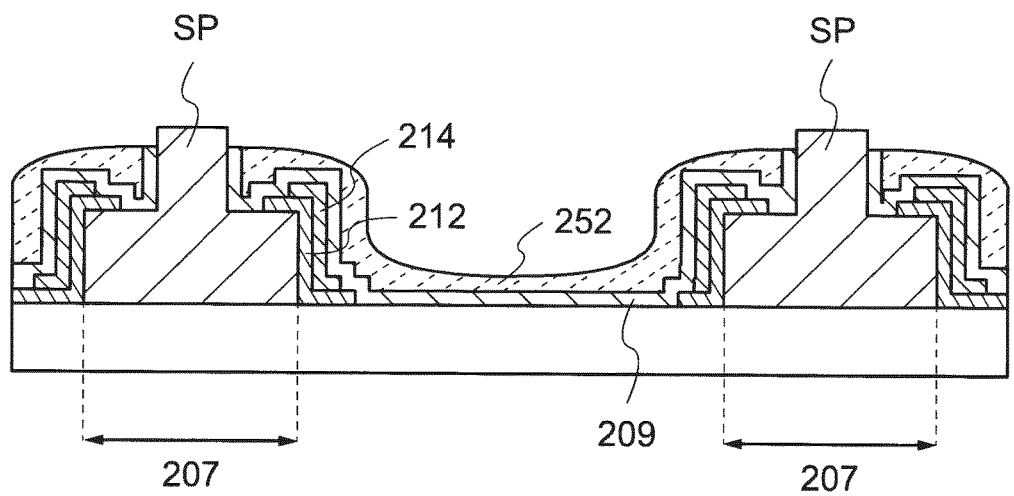
FIG. 20A is a diagram illustrating a method for manufacturing a display device according to an embodiment of the present invention.

FIG. 20A is a diagram illustrating a process of performing an etching process using the resist mask 252. The exposed insulating film 209 on the spacer SP can be removed by performing an etching process. As a result, the upper portion of the spacer SP can be exposed. Thereafter, the resist mask 252 is removed. The opening of the transparent conductive layer 212, the opening of the conductive layer 214, and an opening of the insulating film 209 are arranged so as to surround the spacer SP. Performing the heat treatment in this condition makes it possible to release moisture contained in the planarization film 207 from the exposed region of the spacer SP.

Figure 20B:
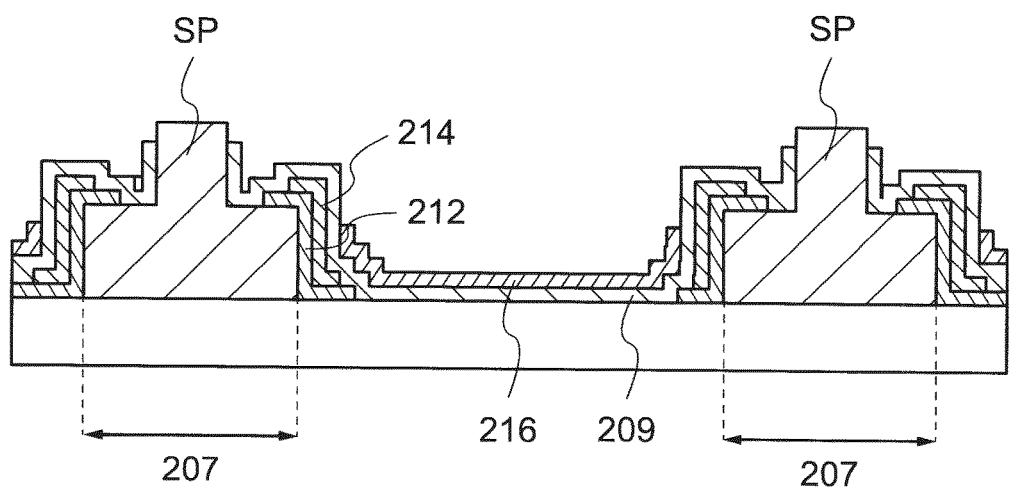
FIG. 20B is a diagram illustrating a method for manufacturing a display device according to an embodiment of the present invention.

FIG. 20B is a diagram illustrating a process of forming the pixel electrode 216 on the insulating film 209. The pixel electrode 216 is arranged in the opening region of the pixel. In other words, the pixel electrode 216 is arranged in the region where the planarization film 207 has been removed. After the pixel electrode 216 is formed, a heat treatment may be performed to release moisture contained in the planarization film 207 from the exposed region of the spacer SP. Finally, a post-bake may be performed.

As described above, a protrusion part functioning as the spacer SP can be formed in the planarization film 207. The transparent conductive layer 212, the conductive layer 214, and the insulating film 209 formed on the planarization film 207 block moisture contained in the planarization film 207. Therefore, exposing the upper portion of the spacer SP makes it possible to release moisture contained in the planarization film 207 by repeated heat treatment. As a result, it is possible to suppress moisture from entering the oxide semiconductor layer formed below the planarization film 207. Therefore, deterioration of the characteristics of the transistor can be suppressed.

[Materials of Each Member of Display Device 10]

A rigid substrate having light transmittance and no flexibility such as a glass substrate, a quartz substrate, and a sapphire substrate can be used the array substrate 150 and the counter substrate 152. On the other hand, in the case where the array substrate 150 and the counter substrate 152 need to have flexibility, a flexible substrate containing a resin and having flexibility such as a polyimide substrate, an acryl substrate, a siloxane substrate, or a fluororesin substrate can be used as the array substrate 150 and the counter substrate 152. In order to improve the heat resistance of the array substrate 150 and the counter substrate 152, impurities may be introduced into the resin. In addition, in the case where the display device 10 is applied to a transparent display or a large display, a glass substrate is preferably used as the array substrate 150 and the counter substrate 152. Further, the first transparent substrate 151A and the second transparent substrate 151B are arranged to protect the array substrate 150 and the counter substrate 152. For this reason, for example, it is preferable to use a glass substrate, a plastic substrate, or the like having light transmittance.

A single layer or a stacked structure of silicon nitride ($SiN_x$), silicon nitride oxide ($SiN_xO_y$), aluminum nitride ($AlN_x$), aluminum nitride oxide ($AlN_xO_y$), silicon oxide ($SiO_x$), silicon oxynitride ($SiO_x N_y$), aluminum oxide ($AlO_x$), and aluminum oxynitride ($AlO_x N_y$) is used as the gate insulting film 203, the insulating film 205, and the insulating film 209. In the present embodiment, the gate insulating film 203 is configured by a stacked structure of the nitride insulating film 203a and the oxide insulating film 203b. In addition, the insulating film 205 is configured by the oxide insulating film 205a and the nitride insulating film 205b. Silicon nitride is used as the nitride insulating films 203a and 205b and the insulating film 209. For example, the silicon nitride film is formed by a sputtering method. In addition, silicon oxide is used as the insulating films 203b and 205a.

$SiO_xN_y$ and $AlO_xN_y$ are a silicon compound and aluminum compound containing a smaller proportion (x>y) of nitrogen (N) than oxygen (O). $SiN_x O_y$ and $AlN_xO_y$ are a silicon compound and aluminum compound containing a smaller proportion of oxygen than nitrogen (x>y).

An organic insulating material such as a polyimide resin, an acryl resin, an epoxy resin, a silicone resin, a fluororesin, or a siloxane resin can be used as the planarization film 207.

Common metal materials can be used as the conductive layers 202, 206, and 208 and the conductive layer 214. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), and an alloy or compound thereof are used as these members. The above-described material may be used in a single layer or in a stacked layer as the above members.

An oxide semiconductor having semiconductor characteristics can be used as the oxide semiconductor layers 204. The oxide semiconductor layer 204 has light transmittance. For example, an oxide semiconductor containing two or more metals including indium (In) is used as the oxide semiconductor layer 204. For example, an oxide semiconductor containing indium (In), gallium (Ga), zinc (Zn), and oxygen (O) may be used as the oxide semiconductor layer 204. In particular, an oxide semiconductor having a composition ratio of In:Ga:Zn:O=1:1:1:4 may be used. However, the oxide semiconductor layer 204 used in the present embodiment is not limited to the above-described compositions, and an oxide semiconductor having compositions other than those described above can also be used.

A mixture of indium oxide and tin oxide (ITO) and a mixture of indium oxide and zinc oxide (IZO) can be used as the transparent conductive layer 212, the pixel electrode 216, and the common electrode 218. A material other than the above may be used as the transparent conductive layer. The light-shielding layer 219 used for a black matrix BM may be formed of a black resin or metal material. The black matrix BM is formed in contact with the common electrode 218 (see FIG. 8). While the common electrode 218 is formed of a transparent conductive film, and the black matrix BM is formed of a metal material, it is possible to provide a function as an auxiliary electrode for reducing resistance dissipation. The black matrix BM may be formed of a single layer or a stacked layer of chrome, molybdenum, titanium, or the like having relatively low reflectance with respect to aluminum.

In the case where the display device 10 is applied to a transparent display, a polymer-dispersed liquid crystal is preferably used as the liquid crystal layer 210. The polymer-dispersed liquid crystal includes bulk and fine particles. The orientation of the fine particles changes in the bulk depending on the potential difference between the pixel electrode 216 and the common electrode 218. The degree of at least one of light transmission and distribution is controlled for each pixel PIX by individually controlling the potential of the pixel electrode 216 for each pixel PIX. The degree of scatter of the liquid crystal layer (fine particles) is controlled depending on the voltage of the pixel electrode 216 and the voltage of the common electrode 218. For example, a polymer-dispersed liquid crystal in which the degree of scattering increases as the voltage between each pixel PIX and the common electrode 218 increases, or a polymer-dispersed liquid crystal in which the degree of scattering increases as the voltage between each pixel electrode 216 and the common electrode 218 decreases may be used as the liquid crystal layer.

The ordinary refractive indices of the bulk and the fine particles are equal to each other in the liquid crystal layer 210. In the case where no voltage is applied between the pixel electrode 216 and the common electrode 218, the refractive index difference between the bulk and the fine particles is zero in all directions. The liquid crystal layer 210 is in the non-scattering state, in which the light emitted from the light source is not scattered. The light emitted from the light source propagates away from a light source 3 (light-emitting unit) while being reflected on the first main surface of the first the array substrate 150 and the first main surface of the counter substrate 152. In the case where the liquid crystal layer 210 is in the non-scattering state, in which the light L emitted from a light source is not scattered, the background of the counter substrate 152 can be visually recognized from the array substrate 150 and the background of the array substrate 150 can be visually recognized from the counter substrate 152.

Between the energized pixel electrode 216 and the common electrode 218, the optical axis of the fine particles will be tilted by the electric field generated between the pixel electrode 216 and the common electrode 218. Since the optical axis of the bulk does not change depending on the electric field, the orientations of the optical axis of the bulk and the optical axis of the fine particles are different from each other. The light emitted from the light source is scattered in the pixel PIX having the pixel electrode 216 to which the voltage is applied. Light in which part of the light emitted from the light source and scattered as described above is emitted to the outside from the first main surface of the array substrate 150 or the first main surface of the counter substrate 152 is observed by the observer.

The background of the first main surface of the counter substrate 152 is visually recognized from the first main surface of the array substrate 150, and the background of the first main surface of the array substrate 150 is visually recognized from the first main surface of the counter substrate 152, in the pixel PIX having the pixel electrode 216 with no voltage applied. Then, in the display device 10 of the present embodiment, when a video signal is input, a voltage is applied to the pixel electrode 216 of the pixel PIX on which an image is displayed, and an image based on the video signal is visually recognized together with the background. In this way, when the polymer-dispersed liquid crystal is in the scattering state, an image is displayed in the display region.

While preferred embodiments have been described above, the present invention is not limited to such embodiments. The contents disclosed in the embodiments are merely examples, and various changes can be made without departing from the spirit of the present invention. Appropriate changes that have been made without departing from the spirit of the present invention naturally fall within the technical scope of the present invention.

What is claimed is:

1. A display device comprising:
    a first conductive layer arranged on a first substrate and extending in a first direction;
    a first insulating film arranged on the first conductive layer;
    a second conductive layer arranged on the first insulating film and extending in a second direction intersecting the first direction;
    a second insulating film arranged on the second conductive layer and extending in the first direction and the second direction;
    a first transparent conductive layer arranged on the second insulating film and extending in the first direction and the second direction;
    a third insulating film arranged on the first conductive layer; and
    a second substrate opposing the first substrate,
    wherein the second insulating film has a first protrusion protruding above a surface of the first transparent conductive layer,
    a first opening surrounding the first protrusion is arranged in the first transparent conductive layer,
    a second opening surrounding the first protrusion is arranged in the third insulating film, and
    the first protrusion is arranged to maintain a gap between the first substrate and the second substrate.

2. The display device according to claim 1, wherein the third insulating film is in contact with a side surface of the first protrusion.

3. The display device according to claim 1, wherein the third insulating film has a second region in contact with the first insulating film.

4. The display device according to claim 1, wherein a thickness of the second conductive layer is thinner than a thickness of the first conductive layer.

5. The display device according to claim 1, further comprising:
    a third conductive layer arranged between the first transparent conductive layer and the third insulating film,
    wherein
    a third opening surrounding the first protrusion is arranged in the third conductive layer, and
    an end portion of the third opening is located outside of an end portion of the first opening.

6. The display device according to claim 1, wherein the first protrusion is arranged in a region where the first conductive layer intersects the second conductive layer.

7. The display device according to claim 6, wherein the first protrusion does not overlap a transistor of a pixel adjacent to the first region.

8. The display device according to claim 1, further comprising:
    a fourth conductive layer arranged on the first substrate and formed in the same layer as the first conductive layer,
    wherein
    the second insulating film has a second protrusion protruding above a surface of the first transparent conductive layer,
    a fourth opening surrounding the second protrusion is arranged in the first transparent conductive layer,
    a fifth opening surrounding the second protrusion is arranged in the third insulating film, and
    the second protrusion is in contact with a surface side of the second substrate.

9. The display device according to claim 8 further comprising:
    a seal material that attaches the second substrate at a peripheral region of the first substrate,
    wherein
    the seal material is in contact with the second protrusion.

10. The display device according to claim 1, further comprising:
    a liquid crystal layer arranged between the first substrate and the second substrate; and
    a light source arranged so that light enters toward a side surface of the first substrate or a side surface of the second substrate.

11. The display device according to claim 10, wherein
    the liquid crystal layer is a polymer-dispersed liquid crystal,
    an image is displayed in a display region when the polymer-dispersed liquid crystal is in a scattering state, and
    a background of the second substrate is visible from the first substrate and a background of the first substrate is visible 10 from the second substrate in the display region when the polymer-dispersed liquid crystal is in a non-scattering state.

* * * * *